US010084988B2

(12) United States Patent
Farrell et al.

(10) Patent No.: US 10,084,988 B2
(45) Date of Patent: Sep. 25, 2018

(54) FACIAL GESTURE RECOGNITION AND VIDEO ANALYSIS TOOL

(71) Applicant: Krush Technologies, LLC, Dayton, OH (US)

(72) Inventors: Matthew J. Farrell, Springboro, OH (US); John P. Nauseef, Kettering, OH (US); Christopher S. Wire, Dayton, OH (US); Brian T. Faust, Springboro, OH (US); Patrick M. Murray, Dayton, OH (US); Linsey Ann Free, Chillicothe, OH (US); Gary T. Riggins, Dayton, OH (US); John C. Nesbitt, Tipp City, OH (US); Dustin L. Clinard, Dayton, OH (US)

(73) Assignee: Krush Technologies, LLC, Dayton, OH (US)

( * ) Notice: Subject to any disclaimer, the term of this patent is extended or adjusted under 35 U.S.C. 154(b) by 0 days.

(21) Appl. No.: 15/466,658

(22) Filed: Mar. 22, 2017

(65) Prior Publication Data
US 2017/0223310 A1    Aug. 3, 2017

Related U.S. Application Data

(63) Continuation-in-part of application No. 15/387,172, filed on Dec. 21, 2016, which is a continuation of
(Continued)

(51) Int. Cl.
*H04N 7/14*    (2006.01)
*G10L 25/90*    (2013.01)
(Continued)

(52) U.S. Cl.
CPC ........... *H04N 7/147* (2013.01); *A63F 13/213* (2014.09); *A63F 13/79* (2014.09); *A63F 13/87* (2014.09);
(Continued)

(58) Field of Classification Search
CPC ........................................................ H04N 7/14
(Continued)

(56) References Cited

U.S. PATENT DOCUMENTS 9,269,374 B1 *  2/2016  Conway ............ G06K 9/00302
2009/0079813 A1 *  3/2009  Hildreth ................. H04N 7/147
                                                            348/14.03
(Continued)

FOREIGN PATENT DOCUMENTS

EP      1078667 A1    2/2001
WO   2014090262 A1    6/2014

OTHER PUBLICATIONS

Extended European Patent Search Report dated Jan. 25, 2018 in connection with European Application No. 15815920.2, 10 pages.

*Primary Examiner* — Olisa Anwah
(74) *Attorney, Agent, or Firm* — Baker & McKenzie LLP

(57) ABSTRACT

Embodiments disclosed herein may be directed to a video communication server. In some embodiments, the video communication server includes: at least one memory including instructions; and at least one processing device configured for executing the instructions, wherein the instructions cause the at least one processing device to perform the operations of: determining a time duration of a video communication connection between a first user of a first user device and a second user of a second user device; analyzing video content transmitted between the first user device and the second user device; determining at least one gesture of at least one of the first user and the second user based on analyzing the video content; and generating a compatibility score of the first user and the second user based at least in part on the determined time duration and the at least one determined gesture.

7 Claims, 8 Drawing Sheets

Related U.S. Application Data application No. 15/197,469, filed on Jun. 29, 2016, now Pat. No. 9,531,998, said application No. 15/387,172 is a continuation-in-part of application No. 14/980,769, filed on Dec. 28, 2015, now abandoned, and a continuation-in-part of application No. 14/790,913, filed on Jul. 2, 2015, now abandoned, application No. 15/466,658, which is a continuation-in-part of application No. 15/003,769, filed on Jan. 21, 2016, now abandoned.

(60) Provisional application No. 62/274,682, filed on Jan. 4, 2016, provisional application No. 62/106,127, filed on Jan. 21, 2015, provisional application No. 62/096,991, filed on Dec. 26, 2014, provisional application No. 62/020,711, filed on Jul. 3, 2014.

(51) Int. Cl.
| | | |
|---|---|---|
| *G06K 9/00* | (2006.01) | |
| *G10L 15/22* | (2006.01) | |
| *A63F 13/213* | (2014.01) | |
| *A63F 13/79* | (2014.01) | |
| *A63F 13/87* | (2014.01) | |

(52) U.S. Cl.
CPC ...... *G06K 9/00315* (2013.01); *G06K 9/00711* (2013.01); *G10L 15/22* (2013.01); *G10L 25/90* (2013.01); *A63F 2300/8094* (2013.01)

(58) Field of Classification Search
USPC .................. 348/14.01, 14.03, 14.08, 14.02
See application file for complete search history.

(56) References Cited

U.S. PATENT DOCUMENTS

| | | | |
|---|---|---|---|
| 2009/0174702 A1 | 7/2009 | Garbow et al. | |
| 2014/0043426 A1* | 2/2014 | Bicanic | H04N 21/41407 348/14.02 |
| 2014/0267548 A1* | 9/2014 | Yee | G06F 3/017 348/14.03 |
| 2014/0300684 A1* | 10/2014 | Fagadar-Cosma | G06F 3/017 348/14.03 |
| 2016/0180797 A1* | 6/2016 | Kamhi | G06F 9/542 345/520 |
| 2016/0210602 A1* | 7/2016 | Siddique | G06Q 20/0453 |
| 2017/0068994 A1* | 3/2017 | Slomkowski | G06Q 30/0269 |
| 2017/0277267 A1* | 9/2017 | Liu | G06F 3/017 |

* cited by examiner

FACIAL GESTURE RECOGNITION AND VIDEO ANALYSIS TOOL

CROSS REFERENCE TO RELATED APPLICATIONS

The present application is a continuation-in-part of and claims priority to U.S. patent application Ser. No. 15/387,172, filed on Dec. 21, 2016, which is a continuation of and claims priority to U.S. patent application Ser. No. 15/197,469, filed on Jun. 29, 2016, now U.S. Pat. No. 9,531,998, which is a non-provisional of and claims priority to U.S. Provisional Patent Application No. 62/274,682 filed on Jan. 4, 2016. Priority U.S. patent application Ser. No. 15/387,172 is also a continuation-in-part of and claims priority to U.S. patent application Ser. No. 14/980,769, which was filed on Dec. 28, 2015, which is a non-provisional of and claims priority to U.S. Provisional Patent Application No. 62/096,991, which was filed on Dec. 26, 2014. Priority U.S. patent application Ser. No. 15/387,172 is also a continuation-in-part of and claims priority to U.S. patent application Ser. No. 14/790,913, which was filed on Jul. 2, 2015, which is a non-provisional of and claims priority to U.S. Provisional Patent Application No. 62/020,711, which was filed on Jul. 3, 2014. The present application is also a continuation-in-part of U.S. application Ser. No. 15/003,769, which was filed on Jan. 21, 2016, which is a non-provisional of and claims priority to U.S. Provisional Patent Application No. 62/106,127. The contents of all of the aforementioned applications are incorporated by reference herein in their entirety.

U.S. patent application Ser. No. 15/197,469 is a continuation-in-part of and claims priority to U.S. patent application Ser. No. 14/790,913, filed on Jul. 2, 2015, and U.S. patent application Ser. No. 14/980,769, filed on Dec. 28, 2015, the contents of all of which are incorporated by reference herein in their entirety. The present application is a continuation-in-part of and claims priority to U.S. patent application Ser. No. 15/003,769, filed on Jan. 21, 2016, the contents of which are incorporated by reference herein in their entirety. U.S. patent application Ser. No. 15/003,769 claims priority to U.S. Provisional Application No. 62/106,127, filed on Jan. 21, 2015, the contents of which are incorporated by reference herein in their entirety. U.S. patent application Ser. No. 14/790,913 claims priority to U.S. Provisional Application No. 62/020,711, filed on Jul. 3, 2014, the contents of which are incorporated by reference herein in their entirety. U.S. patent application Ser. No. 14/980,769, claims priority to U.S. Provisional Application No. 62/096,991, filed on Dec. 26, 2014, the contents of which are incorporated by reference herein in their entirety.

TECHNICAL FIELD

Embodiments disclosed herein relate to a facial gesture recognition and video analysis tool for real-time video communications between devices.

BACKGROUND

Today, social media applications enable users across the world to generate and maintain relationships with others like never before. For example, a user who recently moved to a new city may utilize a social media application to meet other users who live nearby in the new city, as well as to reconnect with users in another city on the other side of the globe. Different social media applications enable users to communicate with others through a variety of communication channels, such as text messaging, audio messaging, picture sharing, and/or live video streaming.

However, communicating via social media applications has its share of shortcomings, which are particularly evident when communication via social media applications is compared to in-person communication. For example, many social cues regularly identified and received during in-person communication, such as slight facial movements and/or vocal inflections, may be imperceivable and/or otherwise go undetected over known social media communication channels. So, while social media applications indeed provide a variety of channels for users to digitally interact with others across the world, their users may still be presented with challenges associated with clarity and/or quality of communication. Further, systems and techniques as described herein may allow users to communicate more effectively with others by providing certain described contextual clues and feedback.

SUMMARY

Briefly, aspects of the present invention relate to improved communication clarity, quality, intelligence, and security through the use of video analysis techniques and communications suggestions. In some embodiments, a video communication server is provided. The video communication server may include: a memory including instructions and a processing device configured to execute the instructions. The instructions may cause the processing device to perform the operations of: determining, using a communication unit in the processing device, a duration of a video communication connection between first and second user devices; analyzing, using a graphical processing unit (GPU) in the processing device, video content transmitted between the user devices; determining, using a gesture analysis unit in the processing device, gestures of the users based on analyzing the video content; and generating, using a compatibility unit in the processing device, a compatibility score of the first user and the second user based at least in part on the video communication connection duration and a gesture.

In some embodiments, the instructions further cause the processing device to perform the operations of: determining, using a location unit in the processing device, a location of a first user device; identifying, using the location unit, a plurality of other user devices determined to be located within a predetermined proximity of the first user device; and filtering, using a profile management unit in the processing device, another user device from the plurality of other user devices based on one or more user preferences of the first user to result in a filtered plurality of other user devices, wherein the second user device is included in the filtered plurality of other user devices.

In some embodiments, the instructions further cause the processing device to perform the operations of: randomly selecting, using the profile management unit, the second user device from the filtered plurality of other user devices; and establishing, using the communication unit, the video communication connection between the first user device and the second user device.

In some embodiments, determining a gesture includes: identifying, using a facial recognition unit in the processing device, a facial feature of the first user in the video content at a first time; identifying, using the facial recognition unit, the facial feature of the first user in the video content at a second time; and determining, using the facial recognition unit, movement of the facial feature from a first location at a first time to a second location at a second time, wherein the determined movement of the facial feature includes a gesture.

In some embodiments, generating a compatibility score includes: assigning, using the compatibility unit, a numerical value to the determined video communication connection duration and to the gesture; weighting, using the compatibility unit, the numerical value of the determined video communication connection duration and the numerical value of the gesture; and processing, according to operations included in a computer-readable memory in the compatibility unit, the numerical value of the determined time duration and the numerical value of the gesture.

In some embodiments, analyzing the video content includes: determining, using the GPU, a numerical value of a pixel associated with a facial feature identified in the video content.

In some embodiments, generating the compatibility score includes: identifying, using a vocal recognition unit in the processing device, a first vocal pitch of the first user in the video content at a first time; identifying, using the vocal recognition unit, a second vocal pitch of the first user in the video content at a second time; and determining, using the vocal recognition unit, a change of vocal pitch of the first user, wherein the change of vocal pitch includes a gesture.

In some embodiments, a non-transitory computer readable medium including code is provided. The code may, when executed by a processing device of a video communication server, cause the processing device to perform the operations of: determining, using a communication unit included in the processing device, a duration of a video communication connection between a first user of a first user device and a second user of a second user device; analyzing, using a graphical processing unit (GPU) in the processing device, video content transmitted between the first user device and the second user device; determining, using a gesture analysis unit in the processing device, a gesture of one of the first user and the second user based on analyzing the video content; and generating, using a compatibility unit included in the processing device, a compatibility score of the first user and the second user based at least in part on the determined video communication connection duration and the gesture.

In some embodiments, the non-transitory computer readable medium further includes code that, when executed by the processing device of the video communication server, causes the processing device to perform the operations of: determining, using a location unit in the processing device, a location of a first user device; identifying, using the location unit, a plurality of other user devices determined to be located within a predetermined proximity of the first user device; and filtering, using a profile management unit in the processing device, another user device from the plurality of other user devices based user preferences of the first user to result in a filtered plurality of other user devices, wherein the second user device is included in the filtered plurality of other user devices.

In some embodiments, the non-transitory computer readable medium further includes code that, when executed by the processing device of the video communication server, causes the processing device to perform the operations of: randomly selecting, using the profile management unit, the second user device from the filtered plurality of other user devices; and establishing, using the communication unit, the video communication connection between the first and second user devices.

In some embodiments, the non-transitory computer readable medium further includes code that, when executed by the processing device of the video communication server, causes the processing device to perform the operations of: identifying, using a facial recognition unit in the processing device, a facial feature of the first user in the video content at a first time; identifying, using the facial recognition unit, the facial feature of the first user in the video content at a second time; and determining, using the facial recognition unit, movement of the facial feature from a first location at a first time to a second location at a second time, wherein the determined movement of the facial feature includes a gesture.

In some embodiments, the non-transitory computer readable medium further includes code that, when executed by the processing device of the video communication server, causes the processing device to perform the operations of: identifying, using a vocal recognition unit in the processing device, a first vocal pitch of the first user in the video content at a first time; identifying, using the vocal recognition unit, a second vocal pitch of the first user in the video content at a second time; and determining, using the vocal recognition unit, a change of vocal pitch of the first user, wherein the change of vocal pitch includes a gesture.

In some embodiments, the non-transitory computer readable medium further includes code that, when executed by the processing device of the video communication server, causes the processing device to perform the operations of: assigning, using the compatibility unit, a numerical value to the determined video communication connection duration and the gesture; weighting, using the compatibility unit, the numerical value of the determined video communication connection duration and the numerical value of the gesture; and processing, according to operations included in computer-readable memory in the compatibility unit, the numerical value of the determined video communication connection duration and the numerical value of the gesture.

In some embodiments, the non-transitory computer readable medium further includes code that, when executed by the processing device of the video communication server, causes the processing device to perform the operations of: determining, using the GPU, a numerical value of a pixel associated with a facial feature identified in the video content.

In some embodiments, the provided method may include: determining, using a communication unit in a processing device, a time duration of a video communication connection between first and second user devices; analyzing, using a graphical processing unit (GPU) in the processing device, video content transmitted between the first and second user devices; determining, using a gesture analysis unit in the processing device, a gesture of either or both of first and second users based on analyzing the video content; and generating, using a compatibility unit in the processing device, a compatibility score of the first user and the second user based at least in part on the determined video communication connection duration and the gesture.

In some embodiments, the method further includes: determining, using a location unit in the processing device, a location of a first user device; identifying, using the location unit, a plurality of other user devices determined to be located within a predetermined proximity of the first user device; and filtering, using a profile management unit in the processing device, another user device from the plurality of other user devices based on user preferences of the first user to result in a filtered plurality of other user devices, wherein the second user device is included in the filtered plurality of other user devices.

In some embodiments, the method further includes: randomly selecting, using the profile management unit, the second user device from the filtered plurality of other user devices; and establishing, using the communication unit, the video communication connection between the first and second user devices.

In some embodiments, the method further includes: identifying, using a facial recognition unit in the processing device, a facial feature of the first user in the video content at a first time; identifying, using the facial recognition unit, the facial feature of the first user in the video content at a second time; and determining, using the facial recognition unit, movement of the facial feature from a first location at a first time to a second location at a second time, wherein the determined movement of the facial feature includes a gesture.

In some embodiments, the method further includes: identifying, using a vocal recognition unit in the processing device, a first vocal pitch of the first user in the video content at a first time; identifying, using the vocal recognition unit, a second vocal pitch of the first user in the video content at a second time; and determining, using the vocal recognition unit, a change of vocal pitch of the first user, wherein the change of vocal pitch includes a gesture.

In some embodiments, the method further includes: assigning, using the compatibility unit, a numerical value to the determined video communication connection duration and to the gesture; weighting, using the compatibility unit, the numerical value of the determined video communication connection duration and the numerical value of the gesture; and processing, according to an algorithm included in the compatibility unit, the numerical value of the determined video communication connection duration and the numerical value of the gesture.

BRIEF DESCRIPTION OF THE DRAWINGS

Reference is now made to the following detailed description, taken in conjunction with the accompanying drawings. It is emphasized that various features may not be drawn to scale and the dimensions of various features may be arbitrarily increased or reduced for clarity of discussion. Further, some components may be omitted in certain figures for clarity of discussion.

In the various figures, the same reference numbers are provided for the same system elements, whereas in other instances similar elements shown in different figures may have different reference numbers. The figures and associated description provide a plurality of different embodiments and similar elements among the figures will illustrate to one of ordinary skill in the art the possible functionality and connection of those elements in the multiple and collective embodiments disclosed herein.

DETAILED DESCRIPTION

Introduction

Embodiments of the present disclosure may be directed to a system that enables establishment of a video communication connection between two or more user devices. In addition to providing a video communication channel via which the two or more users may communicate, the system may further enable real-time analysis of video content (e.g., the live video feed) transmitted between the user devices during the video communication connection. Through analysis of the transmitted video content, the system may repeatedly detect facial features of the users to ensure that images and/or video feeds of the users' faces are appropriately captured and transmitted via the video communication connection. The system may further provide security and blocking of objectionable content such as by ensuring that only a user's facial images are transmitted. Additionally, the system may identify various social cues such as facial gestures and/or vocal inflections of each user. Upon identification, the system may assign a numerical value to each identified social cue. In this manner, emotional intelligence associated with social cues readily recognized by people during in-person communication that may otherwise have been undetected by users of the video communication connection may be considered by the system when generating a compatibility score of the users and/or to otherwise provide social cues to the users.

Illustrative Example

Figure 1:
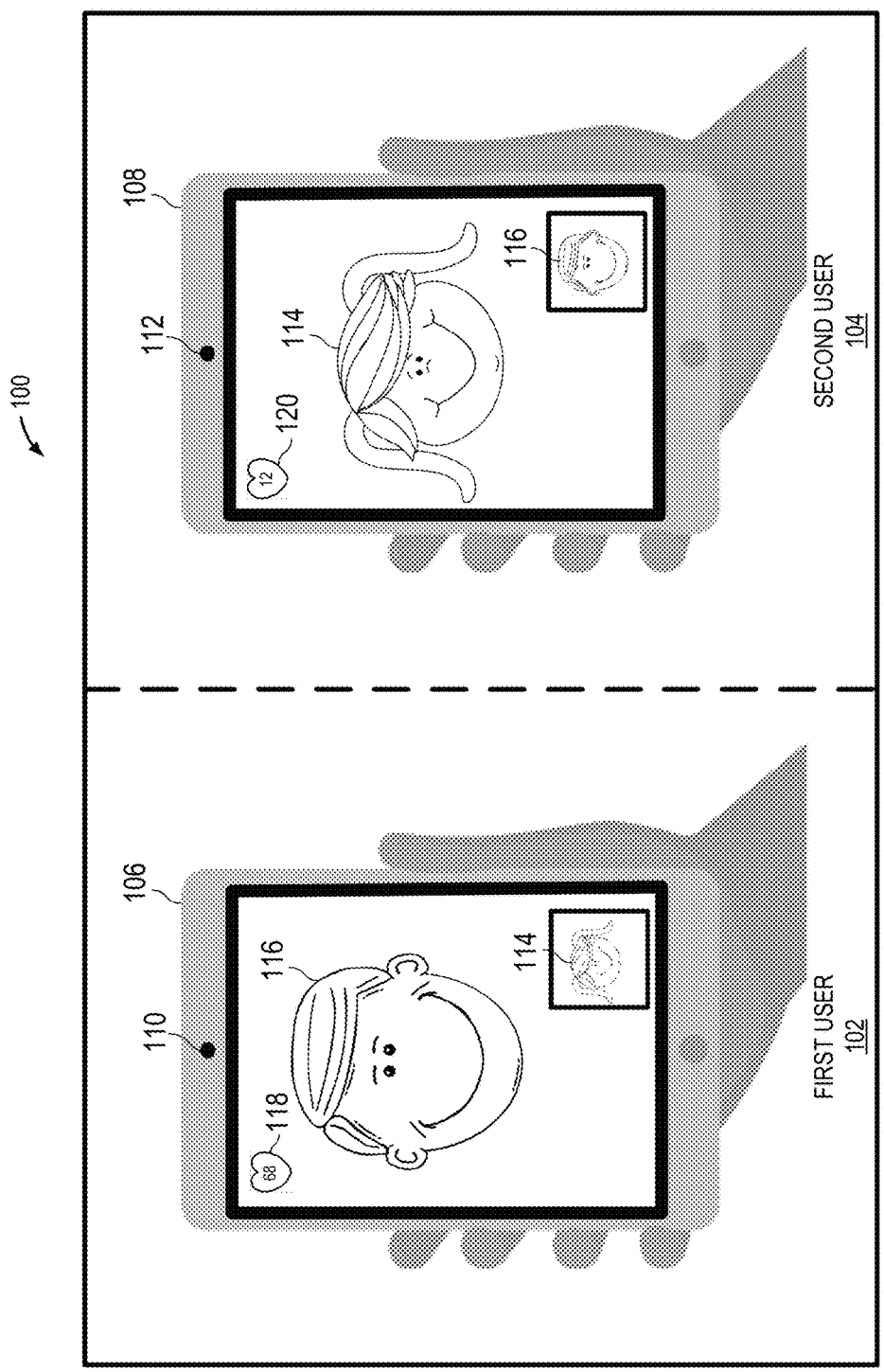
FIG. 1 shows an exemplary video communication connection between two users in accordance with some embodiments of the disclosure.

Referring now to the figures, FIG. 1 illustrates an exemplary video communication connection 100 for enabling a video communication between a first user 102 and a second user 104. For example, each of the first user 102 and the second user 104 may hold a user device (e.g., a first user device 106 and a second user device 108, respectively), such as a smartphone or tablet, in front of his or her face so that a camera 110, 112 included in each respective user device 106, 108 may capture a live video feed of each user's face (e.g., the first user's face 114 and/or the second user's face 116). The first user's face 114 may be presented to the second user 104 on the second user device 108, as well as on the first user device 106 for monitoring purposes. Similarly, the second user's face 116 may be presented to the first user 102 on the first user device 106, as well as on the second user device 108 for monitoring purposes. Additionally, an inset display 118, 120 may further provide information associated with the first user 102 and the second user 104 (e.g., a virtual currency balance, a status, and/or the like) in an inset display on the first user device 106 and the second user device 108, respectively.

To ensure that only faces 114, 116 of the users 102, 104 are displayed throughout the entirety of the video communication connection (as opposed to inappropriate body parts or other potentially undesirable images), a video communication server 210 (not pictured in FIG. 1 but shown in FIGS. 2A, 3A, and 3B) facilitating the video communication connection may analyze the live video feeds of the users 102, 104. Additionally and/or alternatively, each user's respective user device 106, 108 may facilitate the video communication connection and/or analyze the live video feeds of the users 102, 104 in accordance with embodiments described herein. Analyzing the live video feeds may enable the video communication server 210 and/or the user devices 106, 108 to detect facial features of each user 102, 104. If the cameras 110, 112 capturing live video feeds of the respective users 102, 104 capture subject matter that is determined by the server to not be a part of the user's face 114, 116 (e.g., identifies non-facial features or an absence of any facial features in the live video feed), then the video communication server 210 and/or the user devices 106, 108 may terminate the video communication connection or take another action such as interrupting the live video feeds, filtering or obscuring all or part of the video images, and/or adjusting the focus of the respective cameras 110, 112 for security purposes and/or decency considerations.

Continuing with the same example under the assumption that each user 102, 104 allows the camera 110, 112 to capture only her or his face 114, 116, and/or the video communication server 210 otherwise provides suitable security measures, the video communication server 210 and/or the user devices 106, 108 may further analyze the live video feeds of each user's face 114, 116 during the video communication connection to identify social cues, such as facial gestures or vocal inflections, of each user 102, 104. Social cues may be identified by the video communication server 210 and/or the user devices 106, 108 using a variety of video analysis techniques including comparisons of facial feature locations over time. For example, the video communication server 210 and/or the user devices 106, 108 may identify social cues of each user 102, 104 based on detected movements of facial features and/or changes in vocal pitch or tone identified in the live video feeds.

An exemplary social cue identification may include the video communication server 210 and/or the user devices 106, 108 detecting raised eyebrows and a smile of the first user 102 based on an analysis of facial images transmitted during the video communication connection. The video communication server 210 and/or the user devices 106, 108 may determine, based on a predetermined table and/or database of known social cues, that these detected social cues (e.g., raised eyebrows and smile) convey the first user's 102 interest in the second user 104. Accordingly, the video communication server 210 and/or the user devices 106, 108 may then assign the detected raised eyebrow gesture and the detected smile gesture to corresponding numerical values. The video communication server 210 and/or the user devices 106, 108 may then combine the assigned numerical values with other numerical values associated with other detected social cues of the users 102, 104, as well as numerical values associated with external factors such as a duration of the video communication connection, to generate a compatibility score of the two users 102, 104. The compatibility score may numerically communicate how compatible the two users 102, 104 may be with each other based on social cues detected by the video communication server 210 and/or the user devices 106, 108 during the video communication connection.

After the video communication connection is terminated, the video communication server 210 and/or the user devices 106, 108 may present to each user 102, 104 the generated compatibility score, which may be contemplated by the users 102, 104 when determining whether they would like to pursue subsequent communication with each other. In this manner, embodiments disclosed herein may be useful in a variety of social media applications, including but not limited to video speed dating applications.

System Environment

Figure 2:
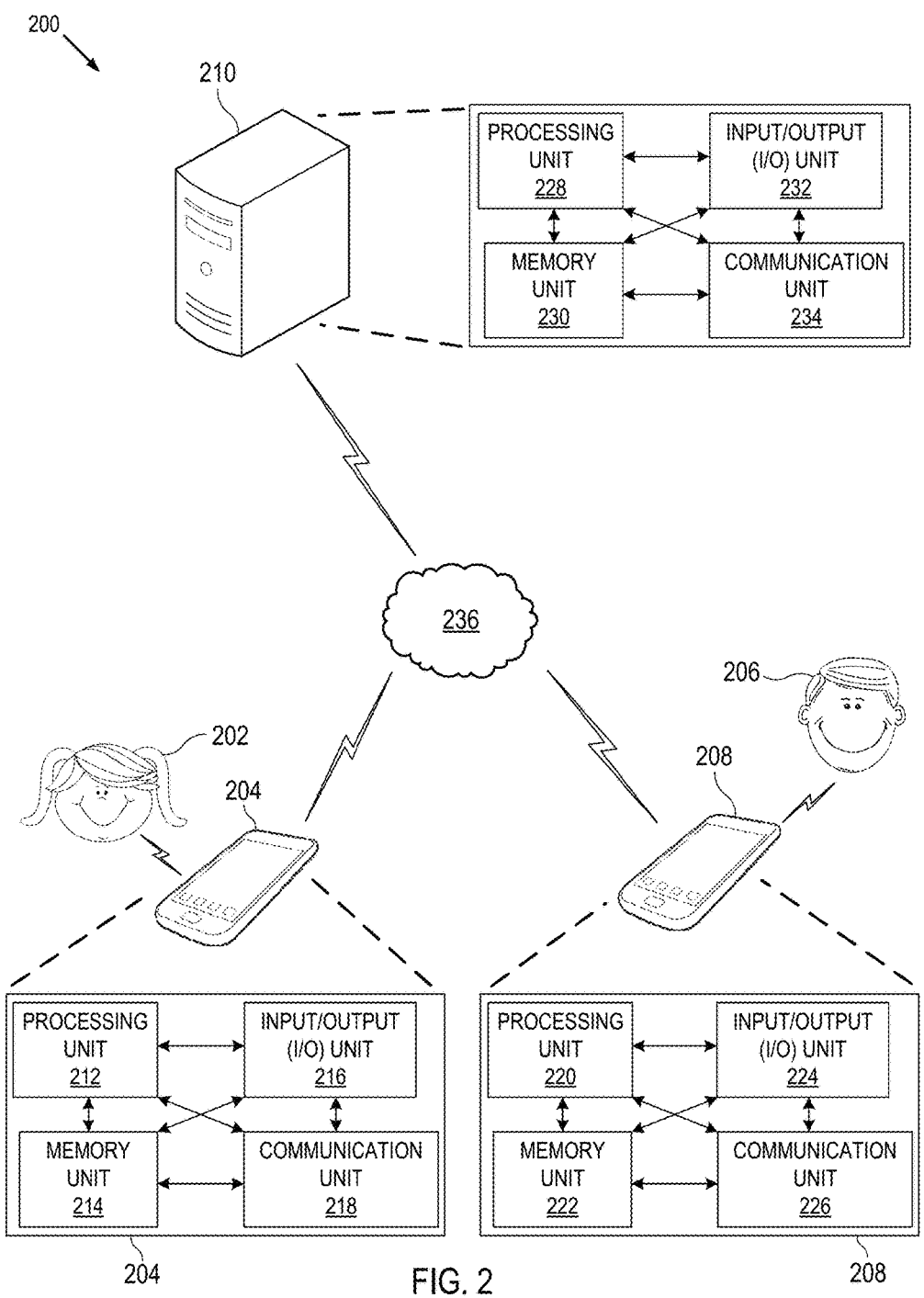
FIG. 2 shows an exemplary system diagram in accordance with some embodiments of the disclosure.

FIG. 2 illustrates a more detailed system 200 for enabling establishment of a video communication connection between a first user 202 of a first user device 204 and a second user 206 of a second user device 208 as described herein (e.g., as described in the illustrative example of FIG. 1). Although two users 202, 206 and user devices 204, 208 are illustrated in the presently described embodiment, the concepts disclosed here may be similarly applicable to an embodiment that includes more than two users and user devices.

In some embodiments, the system 200 may include the first user device 204, the second user device 208, and a video communication server 210. In some embodiments, the first user device 204 and/or the second user device 208 may include a handheld computing device, a smart phone, a tablet, a laptop computer, a desktop computer, a personal digital assistant (PDA), a smart watch, a wearable device, a biometric device, an implanted device, a camera, a video recorder, an audio recorder, a touchscreen, a computer server or video communications server, and/or the like. In some embodiments, the first user device 204 and/or the second user device 208 may each include a plurality of user devices as described herein. In some embodiments, the first user device 204 may include various elements of a computing environment as described herein. For example, the first user device 204 may include a processing unit 212, a memory unit 214, an input/output (I/O) unit 216, and/or a communication unit 218. Each of the processing unit 212, the memory unit 214, the input/output (I/O) unit 216, and/or the communication unit 218 may include one or more subunits as described herein for performing operations associated with providing relevant contextual features to the first user 202 during a video communication connection.

In some embodiments, the second user device 208 may include various elements of a computing environment as described herein. For example, the second user device 208 may include a processing unit 220, a memory unit 222, an input/output (I/O) unit 224, and/or a communication unit 226. Each of the processing unit 220, the memory unit 222, the input/output (I/O) unit 224, and/or the communication unit 226 may include one or more subunits as described herein for performing operations associated with providing relevant contextual features to the second user 206 during a video communication connection.

In some embodiments, the video communication server 210 may include a computing device such as a mainframe server, a content server, a communication server, a laptop computer, a desktop computer, a handheld computing device, a smart phone, a smart watch, a wearable device, a touch screen, a biometric device, a video processing device, an audio processing device, a cloud-based computing solution and/or service, and/or the like. In some embodiments, the video communication server 210 may include a plurality of video communication servers configured to communicate with one another and/or implement load-balancing techniques described herein.

In some embodiments, the video communication server 210 may include various elements of a computing environment as described herein. For example, the video communication server 210 may include a processing unit 228, a memory unit 230, an input/output (I/O) unit 232, and/or a communication unit 234. Each of the processing unit 228, the memory unit 230, the input/output (I/O) unit 232, and/or the communication unit 234 may include one or more subunits and/or other computing instances as described herein for performing operations associated with identifying relevant contextual features for presentation to one or more users (e.g., the first user 202 and/or the second user 206) during a video communication connection.

The first user device 204, the second user device 208, and/or the video communication sever 210 may be communicatively coupled to one another by a network 212 as described herein. In some embodiments, the network 212 may include a plurality of networks. In some embodiments, the network 212 may include any wireless and/or wired communications network that facilitates communication between the first user device 204, the second user device 208, and/or the video communication server 210. For example, the one or more networks may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, and/or the like.

Computing Architecture

Figure 3A:
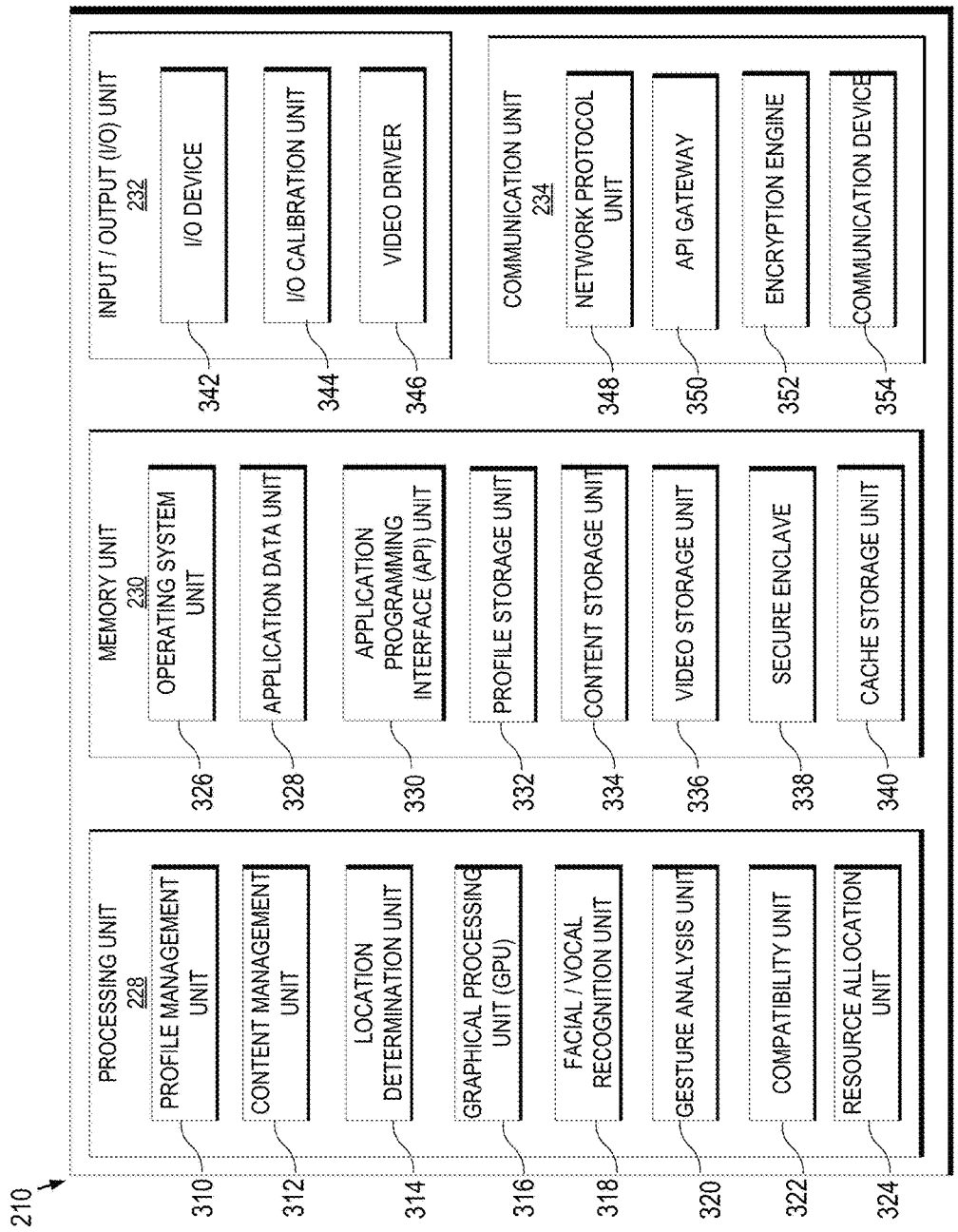
FIG. 3A shows an exemplary functional diagram in accordance with some embodiments of the disclosure.
Figure 3B:
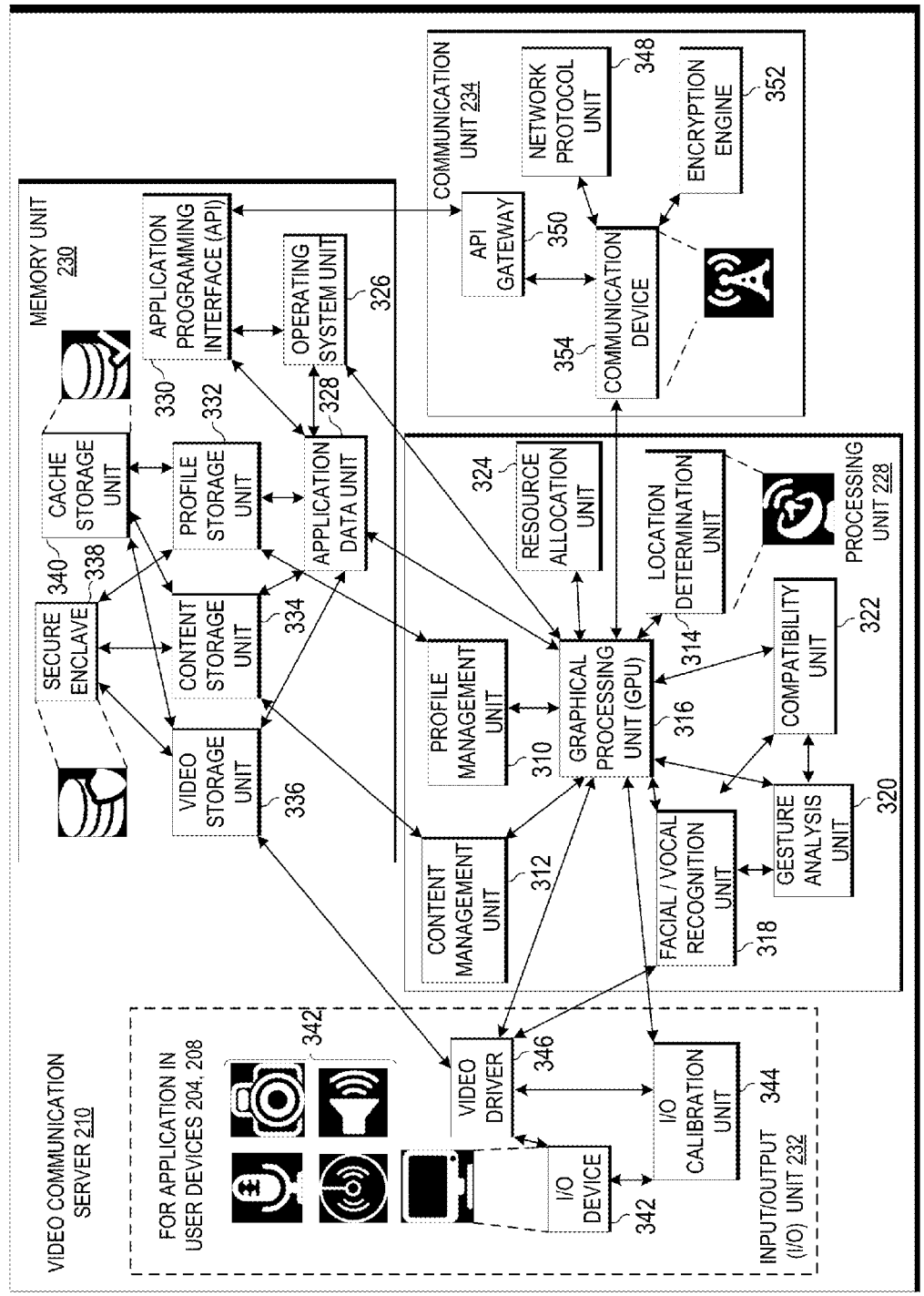
FIG. 3B shows an exemplary system diagram in accordance with some embodiments of the disclosure.

FIG. 3A and FIG. 3B illustrate exemplary functional and system diagrams of the video communication server 210 for enabling the video communication connection and associated video processing techniques described herein. Specifically, FIG. 3A provides a functional block diagram of the video communication server 210, whereas FIG. 3B provides a detailed system diagram of the video communication server 210. Additionally, any units and/or subunits described herein with reference to the video communication server 210 of FIG. 3A and/or FIG. 3B may be included in one or more elements of FIG. 2 such as the first user device 204 (e.g., the processing unit 212, the memory unit 214, the I/O unit 216, and/or the communication unit 218), the second user device 208 (e.g., the processing unit 220, the memory unit 222, the I/O unit 224, and/or the communication unit 226), and/or the video communication server 210 of FIG. 1 and/or FIG. 2 (e.g., the processing unit 228, the memory unit 230, the I/O unit 232, and/or the communication unit 234). The video communication server 210 and/or any of its units and/or subunits described herein may include general hardware, specifically-purposed hardware, and/or software.

The video communication server 210 may include, among other elements, a processing unit 228, a memory unit 230, an input/output (I/O) unit 232, and/or a communication unit 234. As described herein, each of the processing unit 228, the memory unit 230, the I/O unit 232, and/or the communication unit 234 may include and/or refer to a plurality of respective units, subunits, and/or elements. Furthermore, each of the processing unit 228, the memory unit 230, the I/O unit 232, and/or the communication unit 234 may be operatively and/or otherwise communicatively coupled with each other so as to facilitate the video communication and analysis techniques described herein.

The processing unit 228 may control any of the one or more units 230, 232, 234, as well as any included subunits, elements, components, devices, and/or functions performed by the units 230, 232, 234 included in the video communication server 210. The described sub-elements of the video communication server 210 may also be included in similar fashion in any of the other units and/or devices included in the system 200 of FIG. 2. Additionally, any actions described herein as being performed by a processor may be taken by the processing unit 228 alone and/or by the processing unit 228 in conjunction with one or more additional processors, units, subunits, elements, components, devices, and/or the like. Additionally, while only one processing unit 228 may be shown in FIG. 3A and/or FIG. 3B, multiple processing units may be present and/or otherwise included in the video communication server 210 or elsewhere in the overall system (e.g., system 200 of FIG. 2). Thus, while instructions may be described as being executed by the processing unit 228 (and/or various subunits of the processing unit 228), the instructions may be executed simultaneously, serially, and/or otherwise by one or multiple processing units 228.

In some embodiments, the processing unit 228 may be implemented as one or more computer processing unit (CPU) chips and/or graphical processing unit (GPU) chips and may include a hardware device capable of executing computer instructions. The processing unit 228 may execute instructions, codes, computer programs, and/or scripts. The instructions, codes, computer programs, and/or scripts may be received from and/or stored in the memory unit 230, the I/O unit 232, the communication unit 234, subunits and/or elements of the aforementioned units, other devices and/or computing environments, and/or the like.

In some embodiments, the processing unit 228 may include, among other elements, subunits such as a profile management unit 310, a content management unit 312, a location determination unit 314, a graphical processing unit (GPU) 316, a facial/vocal recognition unit 318, a gesture analysis unit 320, a compatibility unit 322, and/or a resource allocation unit 324. Each of the aforementioned subunits of the processing unit 228 may be communicatively and/or otherwise operably coupled with each other.

The profile management unit 310 may facilitate generation, modification, analysis, transmission, and/or presentation of a user profile associated with a user. For example, the profile management unit 310 may prompt a user via a user device to register by inputting authentication credentials, personal information (e.g., an age, a gender, and/or the like), contact information (e.g., a phone number, a zip code, a mailing address, an email address, a name, and/or the like), and/or the like. The profile management unit 310 may also control and/or utilize an element of the I/O unit 232 to enable a user of the user device to take a picture of herself/himself. The profile management unit 310 may receive, process, analyze, organize, and/or otherwise transform any data received from the user and/or another computing element so as to generate a user profile of a user that includes personal information, contact information, user preferences, a photo, a video recording, an audio recording, a textual description, a virtual currency balance, a history of user activity, user preferences, settings, and/or the like.

The content management unit 312 may facilitate generation, modification, analysis, transmission, and/or presentation of media content. For example, the content management unit 312 may control the audio-visual environment and/or appearance of application data during execution of various processes. Media content for which the content management unit 312 may be responsible may include advertisements, images, text, themes, audio files, video files, documents, and/or the like. In some embodiments, the content management unit 312 may also interface with a third-party content server and/or memory location.

The location determination unit 314 may facilitate detection, generation, modification, analysis, transmission, and/or presentation of location information. Location information may include global positioning system (GPS) coordinates, an Internet protocol (IP) address, a media access control (MAC) address, geolocation information, an address, a port number, a zip code, a server number, a proxy name and/or number, device information (e.g., a serial number), and/or the like. In some embodiments, the location determination unit 314 may include various sensors, a radar, and/or other specifically-purposed hardware elements for enabling the location determination unit 314 to acquire, measure, and/or otherwise transform location information.

The GPU unit 316 may facilitate generation, modification, analysis, processing, transmission, and/or presentation of visual content (e.g., media content described above). In some embodiments, the GPU unit 316 may be utilized to render visual content for presentation on a user device, analyze a live streaming video feed for metadata associated with a user and/or a user device responsible for generating the live video feed, and/or the like. The GPU unit 316 may also include multiple GPUs and therefore may be configured to perform and/or execute multiple processes in parallel.

The facial/vocal recognition unit 318 may facilitate recognition, analysis, and/or processing of visual content, such as a live video stream of a user's face. For example, the facial/vocal recognition unit 318 may be utilized for identifying facial features of users and/or identifying vocal inflections of users. In some embodiments, the facial/vocal recognition unit 318 may include GPUs and/or other processing elements so as to enable efficient analysis of video content in either series or parallel. The facial/vocal recognition unit 318 may utilize a variety of audio-visual analysis techniques such as pixel comparison, pixel value identification, voice recognition, audio sampling, video sampling, image splicing, image reconstruction, video reconstruction, audio reconstruction, and/or the like to verify an identity of a user, to verify and/or monitor subject matter of a live video feed, and/or the like.

The gesture analysis unit 320 may facilitate recognition, analysis, and/or processing of visual content, such as a live video stream of a user's face. Similar to the facial/vocal recognition unit 318, the gesture analysis unit 320 may be utilized for identifying facial features of users and/or identifying vocal inflections of users. Further, however, the gesture analysis unit 320 may analyze movements and/or changes in facial features and/or vocal inflection identified by the facial/vocal recognition unit 318 to identify social cues of users. As used herein, social cues may include facial gestures such as eyebrow movements, eyeball movements, eyelid movements, ear movements, nose and/or nostril movements, lip movements, chin movements, cheek movements, forehead movements, tongue movements, teeth movements, vocal pitch shifting, vocal tone shifting, changes in word delivery speed, keywords, word count, and/or the like.

The compatibility unit 322 may facilitate analysis and/or processing of social cues identified by the gesture analysis unit 320. For example, the compatibility unit 322 may quantify identified social cues by assigning a numerical value (e.g., an alphanumeric character) to each identified social cue. In some embodiments, numerical values of identified social cues may be weighted and/or assigned a grade (e.g., an alphanumeric label such as A, B, C, D, F, and/or the like) associated with a perceived value and/or quality by the compatibility unit 322. In addition to assigning numerical values of identified social cues, the compatibility unit 322 may quantify and/or otherwise utilize other factors associated with the video communication connection such as a time duration of the video communication connection, an intensity of an identified social cue, and/or the like. For example, the compatibility unit 322 may assign a larger weight to an identified social cue that occurred during a video communication connection lasting one minute than an identified social cue that occurred during a video communication connection lasting thirty seconds. The compatibility unit 322 may determine appropriate numerical values based on a predetermined table of predefined social cues and/or a variety of factors associated with a video communication connection such as time duration, a frequency, intensity, and/or duration of an identified social cue, and/or the like.

The compatibility unit 322 may also facilitate the collection, receipt, processing, analysis, and/or transformation of user input received from user devices of users participating in a video communication connection (e.g., user devices 106, 108 of FIG. 1 and/or user devices 204, 208 of FIG. 2). For example, the compatibility unit 322 may facilitate the prompting of a first participant in a video communication connection to provide feedback of a second participant. This feedback may be received, processed, weighted, and/or transformed by the compatibility unit 322.

The compatibility unit 322 may further utilize the numerical values of identified social cues and/or other factors, as well as any received feedback (e.g., user inputs such as textual and/or numerical reviews, and/or the like), to generate a compatibility score associated with the compatibility of the two users between which the video communication is held. In some embodiments, the compatibility score may be indicative of a how well the two users may get along in subsequent communications (e.g., video communications, in-person communications, and/or the like). As such, the compatibility unit 322 may facilitate presentation of the compatibility score to each participant of a video communication connection after termination of the video communication connection. In some embodiments, the compatibility unit 322 may generate and/or otherwise represent a compatibility score in the form of a percentage, an alphanumerical grade, an icon, a sound, an image, text, a color, and/or the like.

Additionally, the compatibility unit 322 may facilitate, alone and/or in conjunction with the communication unit 234, the profile management unit 310, and/or the location determination unit 312, matching of user profiles based on information associated with user profiles of users determined to be located in a predetermined location (and/or in proximity of a predetermined location), a user history of generated compatibility scores associated with a user, and/or the like. As described herein, any unit and/or subunit (e.g., element) of the video communication server 210 and/or any other computing environment may be utilized to perform any operation. Particularly, the video communication server 210 may not include a generic computing system, but instead may include a customized computing system designed to perform the various methods described herein.

The resource allocation unit 324 may facilitate the determination, monitoring, analysis, and/or allocation of computing resources throughout the video communication server 210 and/or other computing environments. For example, the video communication server 210 may facilitate a high volume of (e.g., multiple) video communication connections between a large number of supported users and/or associated user devices. As such, computing resources of the video communication server 210 utilized by the processing unit 228, the memory unit 230, the I/O unit, and/or the communication unit 234 (and/or any subunit of the aforementioned units) such as processing power, data storage space, network bandwidth, and/or the like may be in high demand at various times during operation. Accordingly, the resource allocation unit 324 may be configured to manage the allocation of various computing resources as they are required by particular units and/or subunits of the video communication server 210 and/or other computing environments. In some embodiments, the resource allocation unit 324 may include sensors and/or other specially-purposed hardware for monitoring performance of each unit and/or subunit of the video communication server 210, as well as hardware for responding to the computing resource needs of each unit and/or subunit. In some embodiments, the resource allocation unit 324 may utilize computing resources of a second computing environment separate and distinct from the video communication server 210 to facilitate a desired operation.

For example, the resource allocation unit 324 may determine a number of simultaneous video communication connections and/or incoming requests for establishing video communication connections. The resource allocation unit 324 may then determine that the number of simultaneous video communication connections and/or incoming requests for establishing video communication connections meets and/or exceeds a predetermined threshold value. Based on this determination, the resource allocation unit 324 may determine an amount of additional computing resources (e.g., processing power, storage space of a particular non-transitory computer-readable memory medium, network bandwidth, and/or the like) required by the processing unit 228, the memory unit 230, the I/O unit 232, the communication unit 234, and/or any subunit of the aforementioned units for enabling safe and efficient operation of the video communication server 210 while supporting the number of simultaneous video communication connections and/or incoming requests for establishing video communication connections. The resource allocation unit 324 may then retrieve, transmit, control, allocate, and/or otherwise distribute determined amount(s) of computing resources to each element (e.g., unit and/or subunit) of the video communication server 210 and/or another computing environment.

In some embodiments, factors affecting the allocation of computing resources by the resource allocation unit 324 may include the number of ongoing video communication connections and/or other communication channel connections, a duration of time during which computing resources are required by one or more elements of the video communication server 210, and/or the like. In some embodiments, computing resources may be allocated to and/or distributed amongst a plurality of second computing environments included in the video communication server 210 based on one or more factors mentioned above. In some embodiments, the allocation of computing resources of the resource allocation unit 324 may include the resource allocation unit 324 flipping a switch, adjusting processing power, adjusting memory size, partitioning a memory element, transmitting data, controlling one or more input and/or output devices, modifying various communication protocols, and/or the like. In some embodiments, the resource allocation unit 324 may facilitate utilization of parallel processing techniques such as dedicating a plurality of GPUs included in the processing unit 228 for processing a high-quality video stream of a video communication connection between multiple units and/or subunits of the video communication server 210 and/or other computing environments.

In some embodiments, the memory unit 230 may be utilized for storing, recalling, receiving, transmitting, and/or accessing various files and/or information during operation of the video communication server 210. For example, the memory unit 230 may be utilized for storing video streams, storing, recalling, and/or updating user profile information, and/or the like. The memory unit 230 may include various types of data storage media such as solid state storage media, hard disk storage media, and/or the like. The memory unit 230 may include dedicated hardware elements such as hard drives and/or servers, as well as software elements such as cloud-based storage drives. For example, the memory unit 230 may include various subunits such as an operating system unit 326, an application data unit 328, an application programming interface (API) unit 330, a profile storage unit 332, a content storage unit 334, a video storage unit 336, a secure enclave 338, and/or a cache storage unit 340.

The memory unit 230 and/or any of its subunits described herein may include random access memory (RAM), read only memory (ROM), and/or various forms of secondary storage. RAM may be used to store volatile data and/or to store instructions that may be executed by the processing unit 228. For example, the data stored may be a command, a current operating state of the video communication server 210, an intended operating state of the video communication server 210, and/or the like. As a further example, data stored in the memory unit 230 may include instructions related to various methods and/or functionalities described herein. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may be comprised of one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory unit 230 may include one or more databases for storing any data described herein. Additionally or alternatively, one or more secondary databases located remotely from the video communication server 210 may be utilized and/or accessed by the memory unit 230.

The operating system unit 326 may facilitate deployment, storage, access, execution, and/or utilization of an operating system utilized by the video communication server 210 and/or any other computing environment described herein (e.g., a user device such as user devices 106, 108 of FIG. 1 and/or user devices 204, 208 of FIG. 2). In some embodiments, the operating system may include various hardware and/or software elements that serve as a structural framework for enabling the processing unit 228 to execute various operations described herein. The operating system unit 326 may further store various pieces of information and/or data associated with operation of the operating system and/or the video communication server 210 as a whole, such as a status of computing resources (e.g., processing power, memory availability, resource utilization, and/or the like), runtime information, modules to direct execution of operations described herein, user permissions, security credentials, and/or the like.

The application data unit 328 may facilitate deployment, storage, access, execution, and/or utilization of an application utilized by the video communication server 210 and/or any other computing environment described herein (e.g., a user device). For example, users may be required to download, access, and/or otherwise utilize a software application on a user device such as a smartphone in order for various operations described herein to be performed. As such, the application data unit 328 may store any information and/or data associated with the application. Information included in the application data unit 328 may enable a user to execute various operations described herein. The application data unit 328 may further store various pieces of information and/or data associated with operation of the application and/or the video communication server 210 as a whole, such as a status of computing resources (e.g., processing power, memory availability, resource utilization, and/or the like), runtime information, modules to direct execution of operations described herein, user permissions, security credentials, and/or the like.

The API unit 300 may facilitate deployment, storage, access, execution, and/or utilization of information associated with APIs of the video communication server 210 and/or any other computing environment described herein (e.g., a user device). For example, video communication server 210 may include one or more APIs for enabling various devices, applications, and/or computing environments to communicate with each other and/or utilize the same data. Accordingly, the API unit 330 may include API databases containing information that may be accessed and/or utilized by applications and/or operating systems of other devices and/or computing environments. In some embodiments, each API database may be associated with a customized physical circuit included in the memory unit 230 and/or the API unit 330. Additionally, each API database may be public and/or private, and so authentication credentials may be required to access information in an API database.

The profile storage unit 332 may facilitate deployment, storage, access, and/or utilization of information associated with user profiles of users by the video communication server 210 and/or any other computing environment described herein (e.g., a user device). For example, the profile storage unit 332 may store one or more user's contact information, authentication credentials, user preferences, user history of behavior, personal information, and/or metadata. In some embodiments, the profile storage unit 332 may communicate with the profile management unit 310 to receive and/or transmit information associated with a user's profile.

The content storage unit 334 may facilitate deployment, storage, access, and/or utilization of information associated with requested content by the video communication server 210 and/or any other computing environment described herein (e.g., a user device). For example, the content storage unit 334 may store one or more images, text, videos, audio content, advertisements, and/or metadata to be presented to a user during operations described herein. In some embodiments, the content storage unit 334 may communicate with the content management unit 312 to receive and/or transmit content files.

The video storage unit 336 may facilitate deployment, storage, access, analysis, and/or utilization of video content by the video communication server 210 and/or any other computing environment described herein (e.g., a user device). For example, the video storage unit 336 may store one or more live video feeds transmitted during a video communication connection. Live video feeds of each user transmitted during a video communication connection may be stored by the video storage unit 336 so that the live video feeds may be analyzed by various components of the video communication server 210 both in real time and at a time after receipt of the live video feeds. In some embodiments, the video storage unit 336 may communicate with the GPUs 316, the facial/vocal recognition unit 318, the gesture analysis unit 320, and/or the compatibility unit 322 to facilitate analysis of any stored video information. In some embodiments, video content may include audio, images, text, video feeds, and/or any other media content.

The secure enclave 338 may facilitate secure storage of data. In some embodiments, the secure enclave 338 may include a partitioned portion of storage media included in the memory unit 230 that is protected by various security measures. For example, the secure enclave 338 may be hardware secured. In other embodiments, the secure enclave 338 may include one or more firewalls, encryption mechanisms, and/or other security-based protocols. Authentication credentials of a user may be required prior to providing the user access to data stored within the secure enclave 338.

The cache storage unit 340 may facilitate short-term deployment, storage, access, analysis, and/or utilization of data. For example, the cache storage unit 240 may be utilized for storing numerical values associated with users' recognized facial gestures for computing a compatibility score immediately after termination of a video communication connection. In some embodiments, the cache storage unit 348 may serve as a short-term storage location for data so that the data stored in the cache storage unit 348 may be accessed quickly. In some embodiments, the cache storage unit 340 may include RAM and/or other storage media types that enable quick recall of stored data. The cache storage unit 340 may included a partitioned portion of storage media included in the memory unit 230.

The I/O unit 232 may include hardware and/or software elements for enabling the video communication server 210 to receive, transmit, and/or present information. For example, elements of the I/O unit 232 may be used to receive user input from a user via a user device, present a live video feed to the user via the user device, and/or the like. In this manner, the I/O unit 232 may enable the video communication server 210 to interface with a human user. As described herein, the I/O unit 232 may include subunits such as an I/O device 342, an I/O calibration unit 344, and/or video driver 346.

The I/O device 342 may facilitate the receipt, transmission, processing, presentation, display, input, and/or output of information as a result of executed processes described herein. In some embodiments, the I/O device 342 may include a plurality of I/O devices. In some embodiments, the I/O device 342 may include one or more elements of a user device, a computing system, a server, and/or a similar device.

The I/O device 342 may include a variety of elements that enable a user to interface with the video communication server 210. For example, the I/O device 342 may include a keyboard, a touchscreen, a button, a sensor, a biometric scanner, a laser, a microphone, a camera, and/or another element for receiving and/or collecting input from a user. Additionally and/or alternatively, the I/O device 342 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 342 may communicate with one or more elements of the processing unit 228 and/or the memory unit 230 to execute operations described herein. For example, the I/O device 342 may include a display, which may utilize the GPU 316 to present video content stored in the video storage unit 336 to a user of a user device during a video communication connection.

The I/O calibration unit 344 may facilitate the calibration of the I/O device 342. For example, the I/O calibration unit 344 may detect and/or determine one or more settings of the I/O device 342, and then adjust and/or modify settings so that the I/O device 342 may operate more efficiently.

In some embodiments, the I/O calibration unit 344 may utilize a video driver 346 (or multiple video drivers) to calibrate the I/O device 342. For example, the video driver 346 may be installed on a user device so that the user device may recognize and/or integrate with the I/O device 342, thereby enabling video content to be displayed, received, generated, and/or the like. In some embodiments, the I/O device 342 may be calibrated by the I/O calibration unit 344 by based on information included in the video driver 346.

The communication unit 234 may facilitate establishment, maintenance, monitoring, and/or termination of communications (e.g., a video communication connection) between the video communication server 210 and other devices such as user devices (e.g., user devices 106, 108 of FIG. 1 and/or user devices 204, 208 of FIG. 2), other computing environments, third party server systems, and/or the like. The communication unit 234 may further enable communication between various elements (e.g., units and/or subunits) of the video communication server 210. In some embodiments, the communication unit 234 may include a network protocol unit 348, an API gateway 350, an encryption engine 352, and/or a communication device 354. The communication unit 234 may include hardware and/or software elements.

The network protocol unit 348 may facilitate establishment, maintenance, and/or termination of a communication connection between the video communication server 210 and another device (e.g., user devices 106, 108 of FIG. 1 and/or user devices 204, 208 of FIG. 2) by way of a network. For example, the network protocol unit 348 may detect and/or define a communication protocol required by a particular network and/or network type. Communication protocols utilized by the network protocol unit 348 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication between the video communication server 210 and any other device, as well as any element internal to the video communication server 210, may include transforming and/or translating data from being compatible with a first communication protocol to being compatible with a second communication protocol. In some embodiments, the network protocol unit 348 may determine and/or monitor an amount of data traffic to consequently determine which particular network protocol is to be used for establishing a video communication connection, transmitting data, and/or performing other operations described herein.

The API gateway 350 may facilitate the enablement of other devices and/or computing environments to access the API unit 330 of the memory unit 230 of the video communication server 210. For example, a user device may access the API unit 330 via the API gateway 350. In some embodiments, the API gateway 350 may be required to validate user credentials associated with a user of a user device prior to providing access to the API unit 330 to the user. The API gateway 350 may include instructions for enabling the video communication server 210 to communicate with another device.

The encryption engine 352 may facilitate translation, encryption, encoding, decryption, and/or decoding of information received, transmitted, and/or stored by the video communication server 210. Using the encryption engine, each transmission of data may be encrypted, encoded, and/or translated for security reasons, and any received data may be encrypted, encoded, and/or translated prior to its processing and/or storage. In some embodiments, the encryption engine 352 may generate an encryption key, an encoding key, a translation key, and/or the like, which may be transmitted along with any data content.

The communication device 354 may include a variety of hardware and/or software specifically purposed to enable communication between the video communication server 210 and another device, as well as communication between elements of the video communication server 210. In some embodiments, the communication device 354 may include one or more radio transceivers, chips, analog front end (AFE) units, antennas, processing units, memory, other logic, and/or other components to implement communication protocols (wired or wireless) and related functionality for facilitating communication between the video communication server 210 and any other device. Additionally and/or alternatively, the communication device 354 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

System Operation

With specific reference to the system diagram of the video communication server 210 of FIG. 3B, an exemplary operation of the video communication server 210 is described. To begin operation of embodiments described herein, a user of a user device (e.g., user device 204, 208 of FIG. 2) may download an application associated with operations described herein to a user device (e.g., user device 204, 208 of FIG. 2). For example, the user may download the application from an application store or a library of applications that are available for download via an online network. In some embodiments, downloading the application may include transmitting application data from the application data unit 328 of the video communication server 210 to the user device (e.g., user device 204, 208 of FIG. 2) via the communication unit 234.

Upon download and installation of the application on the user device (e.g., user device 204, 208 of FIG. 2), the user may select and open the application. The application may then prompt the user via the user device (e.g., user device 204, 208 of FIG. 2) to register and create a user profile. The user may input, through the user's respective device's I/O unit 216, 224 authentication credentials such as a username and password, an email address, contact information, personal information (e.g., an age, a gender, and/or the like), user preferences, and/or other information as part of the user registration process. This inputted information, as well as any other information described herein, may be inputted by the user of the user device and/or outputted by the video communication server 210 to the user of the user device using the I/O device 342. Once inputted, the information may be received by the user device and subsequently transmitted from the user device to the profile management unit 310 of the processing unit 228 and/or the profile storage unit 332 of the memory unit 232, which receive(s) the inputted information via the communication unit 234.

In some embodiments, registration of the user may include transmitting a text message (and/or another message type) requesting the user to confirm registration and/or any inputted information to be included in the user profile from the profile management unit 310 to the user device (e.g., user device 204, 208 of FIG. 2). The user may confirm registration via the user device (e.g., user device 204, 208 of FIG. 2), and an acknowledgement may be transmitted from the user device (e.g., user device 204, 208 of FIG. 2), via the communication unit 234, to the profile management unit 310 of the processing unit 228, which receives the acknowledgement and generates the user profile based on the inputted information.

After registration is complete, the user may be prompted by the application (e.g., application data stored in the application data unit 328 via the API interface 330, the API gateway 350, and/or the communication device 354) to select a gender corresponding to users with which the user desires to be connected via the application. For example, if the user is a female and wants to video chat with males, then the female may select male as a desired gender. Alternatively, the user may not select a gender, and therefore the gender of other users with whom the user may share a video communication connection may be random. The selected (or unselected) gender preference of other users may be received by the I/O device associated with an I/O unit 216, 224 of a respective user device 204, 208 and subsequently transmitted from the user device to the computing environment for storage in the profile storage unit 332.

Next, the user may utilize an I/O device associated with an I/O unit 216, 224 of her/his user device 204, 208 to capture an picture of her or his face. This picture, once generated, may be included in the user profile of the user for identification of the user. In some embodiments, the user may capture an image of her or his face using a camera on the user device (e.g., a smartphone camera). In other embodiments, the user may simply select and/or upload an existing image file using the user device. The user may further be enabled to modify the image by applying a filter, cropping the image, changing the color and/or size of the image, and/or the like. Accordingly, the user device may receive the image (and/or image file) and transmit the image to the video communication server 210 for processing. Alternatively, the image may be processed locally on the user device.

The image may be received and analyzed (e.g., processed) by the facial/vocal recognition unit 318. In some embodiments, the facial/vocal recognition unit 318 may utilize the GPU 316 for analysis of the image. The facial/vocal recognition unit 318 may process the image of the user's face to identify human facial features. This functionality might be found in one of the processing units 212, 220 of the respective user devices 204, 208 and/or in the processing unit 228 of the video communication server 210. Various techniques may be deployed during processing of the image to identify facial features, such as pixel color value comparison. For example, the facial/vocal recognition unit 318 may identify objects of interest in the image based on a comparison of pixel color values and/or locations in the image. Each identified object of interest may be counted and compared to predetermined and/or otherwise known facial features included in a database using the facial/vocal recognition unit 318. The facial/vocal recognition unit 318 may determine at least a partial match (e.g., a partial match that meets and/or exceeds a predetermined threshold of confidence) between an identified object of interest and a known facial feature to thereby confirm that the object of interest in the image is indeed a facial feature of the user. Based on a number and/or a location of identified facial features in the image, the facial/vocal recognition unit 318 may determine that the image is a picture of the user's face (as opposed to other subject matter, inappropriate subject matter, and/or the like). In this manner, the facial/vocal recognition unit 318 provides a layer of security by ensuring that each image included in a user's profile is a picture of the user's face.

When the facial/vocal recognition unit 318 determines that the image is an acceptable picture of the user's face, the video communication server 210 may store the image in the profile storage unit 332 so that the image may be included in the user's user profile. Conversely, when the facial/vocal recognition unit 318 determines that the image is not an acceptable picture of the user's face (e.g., the image is determined to not be a picture of the user's face), the facial/vocal recognition unit 318 may generate a notification to be sent to and/or displayed by the user device for presentation to the user that explains that the provided image is unacceptable. The user may then repeat the process of capturing an image of her or his face and/or resubmitting an existing image file using the user device. In some embodiments, the user may be prohibited by the facial/vocal recognition unit 318 of the video communication server 210 and/or a video driver 346 of her/his respective user device 204, 208 from continuing application use until an image of the user's face is determined by the facial/vocal recognition unit 318 to be legitimate. As an additional security measure, an additional personal screening may be provided for an acceptable base image. This base image may be specifically compared via computer video processing of live images for closeness.

As stated above, the image may be processed by the facial/vocal recognition unit 318 on the user device. In other embodiments, the image may be transmitted to another device (e.g., video communication server 210, a third party server, and/or the like) for processing. In some embodiments, any facial features of the user identified by the facial/vocal recognition unit 318 may be stored in the profile storage unit 332 for later recall during analysis of video content of the user.

Next, the location determination unit 314 may determine the location of the user device of the user (and therefore the user) using various techniques. For example, the location determination under 314 may determine GPS coordinates, an IP address, a proximity of a predetermined location, a nearest zip code, and/or the like of the user device. Location information of the user's user device may be stored by the video communication server 210 in the profile storage unit 332 so that it may be included in the user's user profile. In some embodiments, the location determination unit 314 of the video communication server 210 may perform the location determination steps associated with locating a user device (e.g., user device 204, 208 of FIG. 2) described herein. Alternatively, the location determination unit 314 local to a user device 204, 208 may perform the location determination steps associated with locating a user device (e.g., user device 204, 208 of FIG. 2) described herein.

Once the image of the user's face is detected and/or determined to be sufficient for inclusion in the user's user profile by the facial/vocal recognition unit 318 and the location of the user's user device is determined by the location determination unit 314, the user may initiate, using the user device (e.g., user device 204, 208 of FIG. 2), a request to begin a video communication connection between the user device and a second user device of another user. For example, in the context of a social media application that enables users to video chat in a speed dating format, the user may initiate a request to be connected to another user of the desired gender (or an unspecified gender) within a predetermined proximity of the determined location of the user's user device (e.g., user device 204, 208 of FIG. 2). In some embodiments, the request may be initiated by the user using the I/O device 342 within the I/O unit 232 of the user device 204, 208. For example, the user may perform a gesture recognized by the I/O device 342 (and/or the gesture analysis unit 320), such as holding down one finger on a touchscreen for a predetermined amount of time, to initiate the request.

After initiation, the request may be transmitted to and/or received by the communication unit 234 of the video communication server 210. The request may include connection information such as wireless band information, encryption information, wireless channel information, communication protocols and/or standards, and/or other information required for establishing a video communication connection between the user device and a second user device.

The communication unit 234 may then utilize one or more units of the processing unit 228 and/or the memory unit 230 to determine a device with which the user device may establish a communication connection. For example, the communication unit 234 may utilize the profile management unit 310 (and/or the profile storage unit 332) and/or the location determination unit 314 to identify a plurality of second user devices associated with users of the desired gender (if specified) that are located within a predetermined proximity of the determined location of the user's user device. In some embodiments, the location determination unit 314 may first identify the plurality of second user devices. Next, the profile management unit 310 may access the profile storage unit 332 to identify which of the second user devices included in the plurality of second user devices identified by the location determination unit 314 are associated with second users of the gender desired by the user. The profile management unit 314 and/or the compatibility unit 322 may then filter a second user device from the plurality of second user devices to result in a filtered plurality of second user devices. As such, each second user device associated with a second user of a different gender than the gender desired by the user may be filtered (e.g., removed) from the plurality of second users so that each second user device included in the filtered plurality of second user devices is associated with a second user of the gender desired by the user. In other embodiments, gender filtering of second user devices may occur prior to determining locations of second user devices.

The communication unit 234, the profile management unit 310, and/or the compatibility unit 322 may select a second user device from the filtered plurality of second user devices. In some embodiments, the selected second user device may be randomly selected by the communication unit 234, the profile management unit 310, and/or the compatibility unit 322 from the filtered plurality of second user devices. In other embodiments, the selected second user device may be selected by the communication unit 234, the profile management unit 310, and/or the compatibility unit 322 from the filtered plurality of second user devices based on a variety of factors. For example, the communication unit 234, the profile management unit 310, and/or the compatibility unit 322 may select the selected second user device based on determining that it is the closest second user device of the filtered plurality of second user devices to the user device of the user. The communication unit 234, the profile management unit 310, and/or the compatibility unit 322 may also select the selected second user device based on determining at least a partial match between information included in the user profile associated with the user and information included in the user profile associated with a second user of the selected second user device.

The communication unit 234 may then establish a video communication connection between the user device of the user and the selected second user device. In some embodiments, establishing the video communication connection may include receiving and/or determining one or more communication protocols (e.g., network protocols) using the network protocol unit 348. For example, the video communication connection may be established by the communication unit 234 using communication protocols included in the request to establish the video communication connection submitted by the user.

In some embodiments, the established video communication connection between the user device of the user and the selected second user device may be configured by the communication unit 234 to last for a predetermined duration. For example, according to rules defined by the application and/or stored in the application data unit 328, the video communication connection may be established for a duration of one minute, after which the video communication connection may be terminated. Limiting the duration of the video communication connection may force communicating users to form an opinion of each other relatively quickly (e.g., within the allotted time duration of the video communication).

While the video communication connection is being established (e.g., prior to enabling the user and the second user to communicate via a live video feed), the content management unit 312 may present each user with content that the two users may discuss during their video communication connection (if desired). For example, the provided content may serve as an ice breaker for conversation and may include a random fact, a joke, a quote, a news story, an image, a video clip, an audio clip, text, and/or the like. The content may be retrieved from the content storage unit 334 by the content management unit 312 and presented to each user using the I/O device 342 included in each of their respective user devices 204, 208.

Once the video communication connection has been established by the communication unit 234, the user device and/or the second user device may enable the user and the second user, respectively, to stream a live video feed to one another. For example, the user may utilize the I/O device 342 (e.g., a camera and a microphone) included in the user device 204, 208 to capture a live video feed of the user's face and voice. Similarly, the second user may utilize the I/O device 342 (e.g., a camera and a microphone) included in the second user device to capture a live video feed of the second user's face and voice. In some embodiments, the live video feeds and/or the live audio feeds captured by the user device may be transmitted from the user device to the second user device for display to the second user, and vice versa. In this manner, the user and the second user may communicate by viewing and/or listening to the live video feeds and/or the live audio feeds received from the other user (e.g., the second user and/or the user, respectively) using the established video communication connection.

Additionally, the live video feeds and/or the live audio feeds of the communicating users may be transmitted to and/or received by the video communication server 210 for processing. For example, the GPU 316, the facial/vocal recognition unit 318, the gesture analysis unit 320, and/or the compatibility unit 322 may analyze the live video feeds and/or the live audio feeds. In some embodiments, the GPU 316, the facial/vocal recognition unit 318, the gesture analysis unit 320, and/or the compatibility unit 322 may analyze the live video feeds and/or the live audio feeds to determine whether the live video feeds and/or the live audio feeds include appropriate content only (e.g., do not include inappropriate content such as inappropriate subject matter, profanity, and/or the like). In some embodiments, the facial/vocal recognition unit 318, the gesture analysis unit 320, and/or the compatibility unit 322 may analyze the live video feeds and/or the live audio feeds in real time during the duration of the video communication connection and/or after the video communication connection has been terminated.

Similar to the processes outlined above that are associated with confirming the captured image of the user's face indeed includes only the user's face, the GPU 316 and/or the facial/vocal recognition unit 318 may analyze the live video feeds and/or the live audio feeds to determine that the live video feeds being transmitted between the users by way of the video communication connection include only each user's face. For example, the facial/vocal recognition unit 318 may employ various pixel comparison techniques described herein to identify facial features in the live video feeds of each user to determine whether the live video feeds are indeed appropriate. Additionally, the facial/vocal recognition unit 318 may analyze any captured audio of each user. Analysis of captured audio may include vocal recognition techniques so that the identity of each user may be confirmed. Further, the facial/vocal recognition unit 318 may analyze captured audio of each user to identify keywords, changes in vocal pitch and/or vocal tone, and/or other objects of interest. Identifying objects of interest such as changes in vocal pitch and/or vocal tone or keywords in a user's speech may enable the facial/vocal recognition unit 318 to determine whether that user is laughing, crying, yelling, screaming, using sarcasm, and/or is otherwise displaying a particular emotion (e.g., a positive emotion and/or a negative emotion).

If the facial/vocal recognition unit 318 determines any content of the live video feeds and/or the live audio feeds is inappropriate based on its analysis of the live video feeds and/or the live audio feeds (e.g., based on determining no facial features are present in the live video feeds and/or determining that inappropriate subject matter is present in the live video and/or audio feeds), then the communication unit 234 may terminate the video communication connection. For example, if the facial/vocal recognition unit 318 determines that the user's face has left the frame being captured by a video camera on the user device, the communication unit 234 may terminate and/or otherwise suspend the video communication connection.

Accordingly, any objects of interest identified by the facial/vocal recognition unit 318 (e.g., facial features, a vocal identity, and/or the like) may be analyzed by the gesture analysis unit 320. In some embodiments, the gesture analysis unit 320 may compare identified objects of interest over time. For example, the gesture analysis unit 320 may determine an amount of movement of one or more facial features based on pixel locations of identified facial features, a change in color of one or more facial features, a change in vocal inflection, vocal pitch, vocal phrasing, rate of speech delivery, and/or vocal tone, and/or the like. The gesture analysis unit 320 may, based on the analysis of the live video feeds and/or the live audio feeds, determine one or more gestures performed by the user and/or the second user. For example, based on determining that both corners of the user's lips moved upwards in relation to other identified facial features, such as the user's chin, the gesture analysis unit 320 may determine that the user has smiled. In some embodiments, the gesture analysis unit 320 may determine a gesture has been performed by a user based on a combination of factors such as multiple facial feature movements, vocal inflections, speaking of keywords, and/or the like. In some embodiments, the gesture analysis unit 320 may determine a gesture has been performed based on determining at least a partial match between identified facial feature movements, vocal changes, and/or the like and a predetermined gesture patterns stored in a database (e.g., stored in memory unit 230). In some embodiments, a gesture may include a detected movement of one or more facial features, a facial expression of an emotion, a change in vocal inflection, tone, and/or speech pattern, a recitation of one or more keywords, phrases, and/or syllables, and/or any other audio-visual expression associated with an emotion and/or a feeling. In some embodiments, the gesture analysis unit 320 of the video communication server 210 may perform the video analysis and/or gesture identification steps described herein. Alternatively, the gesture analysis unit 320 of a user device (e.g., user device 204, 208 of FIG. 2) may perform the video analysis and/or gesture identification steps described herein.

Each identified gesture may next be assigned a numerical value associated with a predetermined emotion by the gesture analysis unit 320 and/or the compatibility unit 322. For example, an identified smile gesture may be assigned a positive numerical value, whereas an identified frown gesture may be assigned a negative numerical value. Additionally and/or alternatively, the gesture analysis unit 320 and/or the compatibility unit 322 may assign different weights to the numerical values of different identified gestures. For example, a numerical value associated with an identified large smile gesture might be weighted by the gesture analysis unit 320 and/or the compatibility unit 322 more heavily than a numerical value associated with an identified small smirk gesture.

After expiration of the time duration of the video communication connection, the communication unit 234 may terminate the video communication connection. The compatibility unit 322 may determine an amount of time associated with the duration of the video communication connection. In some embodiments, the duration of the video communication connection may be predetermined. In other embodiments, the duration of the video communication connection may be shorter than a predetermined time duration if the user and/or the second user decides to terminate the video communication connection early. The compatibility unit 322 may assign a numerical value to the time duration of the video communication. In this manner, the compatibility unit 322 may attempt to reflect an amount of interest between the user and the second user based on how long the video communication connection lasted.

For example, a video communication connection lasting for the entire predetermined time duration may indicate interest between the user and the second user (or at least may indicate that there was no reduced level of interest). Conversely, a video communication connection lasting for a portion of the predetermined time duration may indicate a reduced level of interest between the user and the second user. Accordingly, the numerical value assigned by the compatibility unit 322 to the time duration associated with the video communication connection lasting for a portion of the predetermined time duration may be less than the numerical value assigned by the compatibility unit 322 to the time duration associated with the video communication connection lasting for the entire predetermined time duration.

The compatibility unit 322 may combine the numerical value associated with the time duration of the video communication and numerical values associated with gestures identified by the gesture analysis unit 320 to generate a compatibility score. As described above, the compatibility score may represent how compatible the user is with the second user based on the analysis of the live video feeds and/or the live audio feeds. The compatibility score may be presented to the user and/or the second user after termination of the video communication connection to be used by the user and/or the second user in determining whether the user and/or the second user would like to communicate again with each other. For example, a high compatibility score (e.g., 98%) may suggest that the user and the second user are highly compatible, and thus may indicate that the each of user and the second user would like to pursue subsequent communication with each other. Alternatively, a low compatibility score (e.g., 14%) may suggest that the user and the second user are not highly compatible, and thus may indicate that the each of user and the second user would not like to pursue subsequent communication with each other.

Next, the user and/or the second user may be enabled via the I/O device 342 to select whether she or he desires to share contact information (e.g., information stored in the users' profiles) with the second user and/or the user, respectively. If both the user and the second user select to share contact information, perhaps based on consideration of a high compatibility score, the user and the second user may share contact information with each other, and the communication unit 234 may enable the user and the second user to communicate via a variety of communication channels as described herein. Additionally, the compatibility unit 322 may increment a digit counter associated with each of the user and the second user. These digit counters may serve as a virtual currency during operation of the application described herein and may be included in each respective user's user profile.

Conversely, if one of the users selects not to share contact information, perhaps based on consideration of a mediocre compatibility score, contact information of each user may not be shared between the user and the second user. Instead, the user and/or the second user may be enabled by the compatibility unit 322 and/or the profile management unit 310 to spend (e.g., transfer) one or more units of virtual currency in order to reattempt communication with the second user and/or the user, respectively. Virtual currency spent in this fashion may cause the compatibility unit 322 and/or the profile management unit 310 to transfer virtual currency from an account associated with the user to an account associated with the second user, or vice versa. For example, the digit counter of the user may be decremented a predetermined amount by the profile management unit 310 and/or the compatibility unit 322, whereas the digit counter of the second user may be incremented the predetermined amount by the profile management unit 310 and/or the compatibility unit 322. The user and/or the second user may accept or reject the reattempt at communication using the I/O device 342. If accepted, the communication unit 234 may reestablish the video communication connection for a predetermined amount of time.

In some embodiments, the application data stored in the application data unit 328 and/or the API unit 330 may enable the application described herein to interface with social media applications. For example, a user may be enabled to import from a social media application so that the user may establish video communication connections with existing contacts. The communication unit 234 may further enable the user to communicate in various communication channels such as text messaging, video chatting, picture sharing, audio sharing, and/or the like.

At various times throughout operation of the application described herein, advertisements and/or notifications of performed actions may be presented to each of the users by the content management unit 312. For example, if a participating user of a video communication connection ends a video communication connection prematurely (e.g., before expiration of the predetermined time duration of the video communication connection), then the user may be forced to watch an advertisement video.

In some embodiments, the user may be enabled by the communication unit 234 to leave a first video communication connection for a second video communication connection. For example, the communication unit 234 may, in response to receiving a request to initiate a second video communication connection, terminate a first video communication connection with a first second user device and establish a second video communication connection with another second user device.

The profile management unit 310 may enable the user to report any experienced negative behavior of other uses. For example, if a live video feed of a second user displays inappropriate subject matter and/or a live audio feed of a second user displays profanity, the user may provide feedback to the video communication server 210 indicating negative behavior associated with the second user. If any user receives a number of negative reports associated with inappropriate behavior that meets or exceeds a predetermined threshold, that user may be banned from and/or otherwise limited access to the application for a predetermined period of time by the profile management unit 310.

In some embodiments, the profile management unit 310 may further enable purchase of virtual currency, facilitate the transfer of real monetary funds between bank accounts, and/or the like. Additionally, the profile management unit 310 may track behavior of the user and may provide rewards, such as virtual currency, based on actions performed by the user during operation of the application.

Method Descriptions

Figure 4:
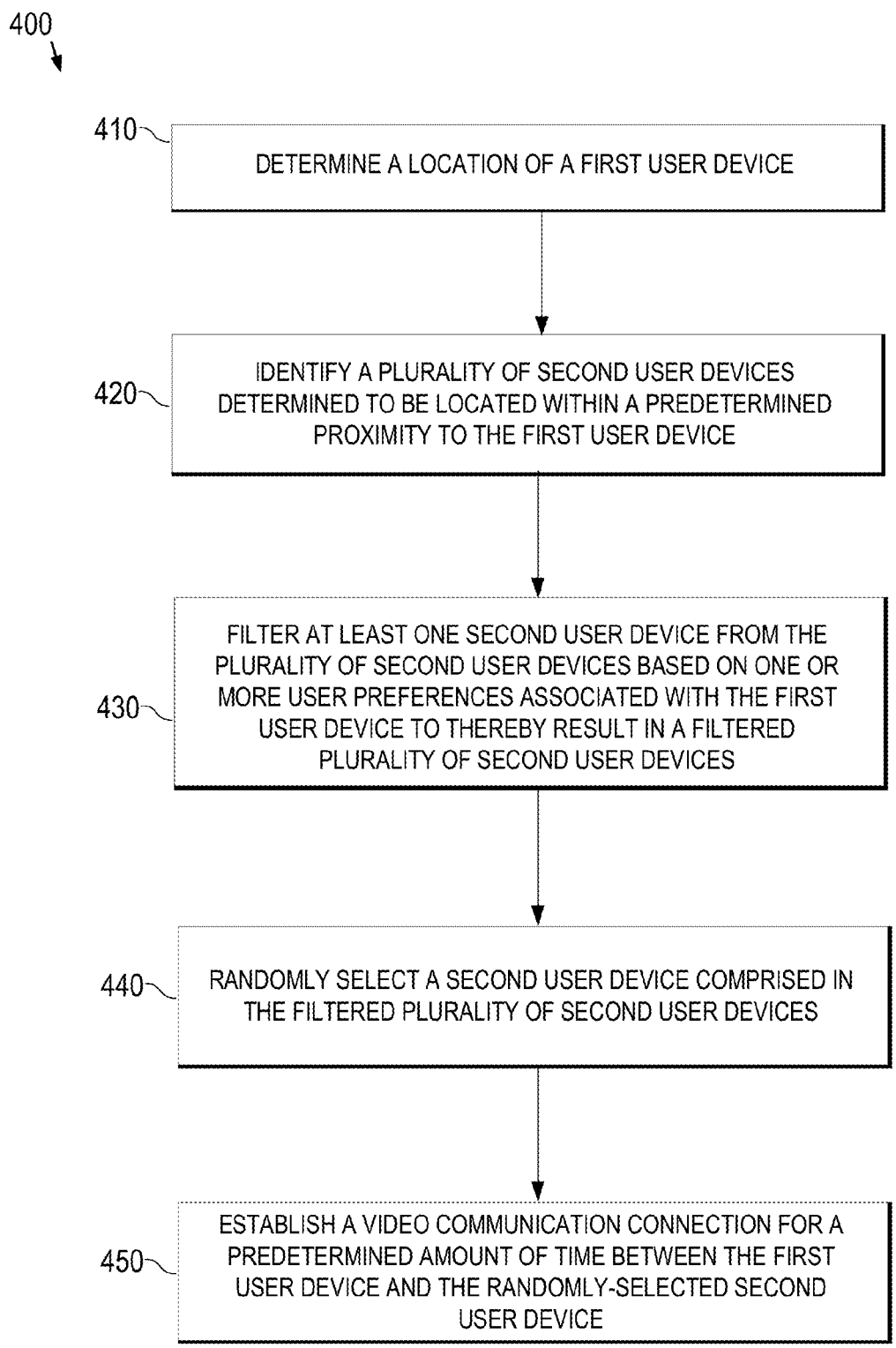
FIG. 4 shows an exemplary method of performing operations associated with establishing a video communication between two users in accordance with some embodiments of the disclosure.

FIG. 4 shows an exemplary method 400 for performing operations associated with establishment of a video communication connection as described herein. At block 410, the method 400 may include determining, using a location determination unit 314 included in a processing unit 228 of a video communication server 210, a location of a first user device. At block 420, the method 400 may include identifying, using the location determination unit 314, a plurality of second user devices determined to be located within a predetermined proximity of the first user device. At block 430, the method 400 may include filtering, using the location determination unit 314, a profile management unit 310, and/or a graphical processing unit (GPU) 316 of the processing unit 228, a second user device from the plurality of second user devices based on one or more user preferences associated with the first user device and stored in a profile storage unit 332 of a memory unit 230 of the video communication server 210 to thereby result in a filtered plurality of second user devices. At block 440, the method 400 may include randomly selecting, using the profile management unit 310 and/or a content management unit 312 of the processing unit 228 of the video communication server 210, a second user device included in the filtered plurality of second user devices. At block 450, the method 400 may include establishing, using a communication device 354 and/or a network protocol unit 348 of a communication unit 234 of the video communication server 210, a video communication connection for a predetermined amount of time between the first user device and the randomly-selected second user device.

Figure 5:
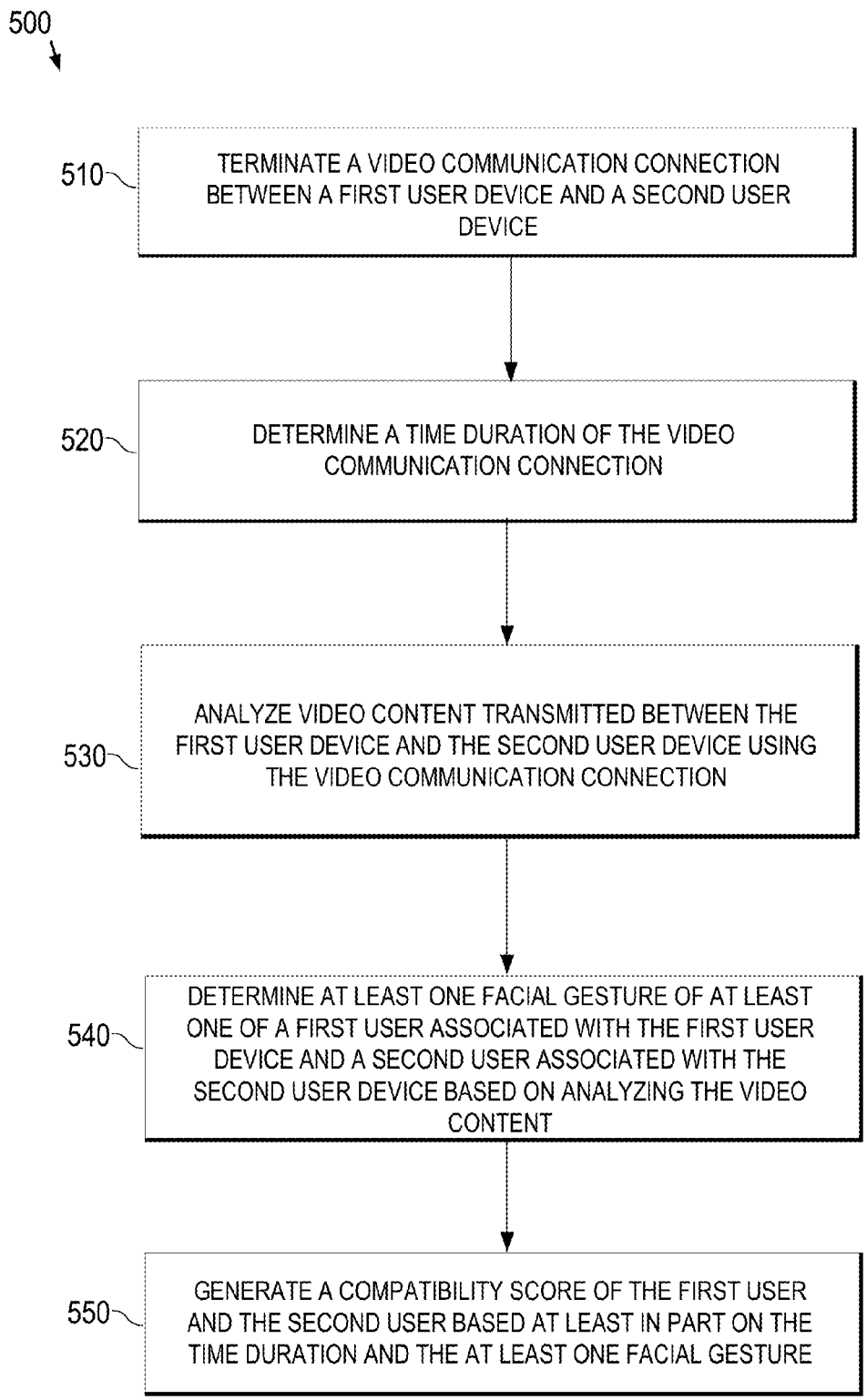
FIG. 5 shows an exemplary method of performing operations associated generating a compatibility score based on a terminated video communication connection between two users in accordance with some embodiments of the disclosure.

FIG. 5 shows an exemplary method 500 for performing operations associated with generation of a compatibility score as described herein. At block 510, the method 500 may include terminating, using a communication device 354 and/or a network protocol unit 348 of a communication unit 234 of the video communication server 210, a video communication connection between a first user device and a second user device. At block 520, the method 500 may include determining, using the GPU 316 of the processing unit 228 of the video communication server 210 and/or a video driver 346 included in an I/O unit 232 of either the first or second user device, a duration of the video communication connection. At block 530, the method 500 may include analyzing, using the GPU 316 and/or facial/vocal recognition unit 318 of the processing unit 228 of the video communication server 210, video content transmitted between the first user device and the second user device using the video communication connection. At block 540, the method 500 may include determining, using the GPU 316, the facial/vocal recognition unit 318, and/or the gesture analysis unit 320 of the processing unit 228 of the video communication server 210 at least one facial gesture of at least one of a first user associated with the first user device and a second user associated with the second user device based on analyzing the video content. At block 550, the method 500 may include generating, using the GPU 316 and/or a compatibility unit 322 of the processing unit 228 of the video communication server 210, a compatibility score of the first user and the second user based at least in part on the time duration and the at least one facial gesture.

Figure 6:
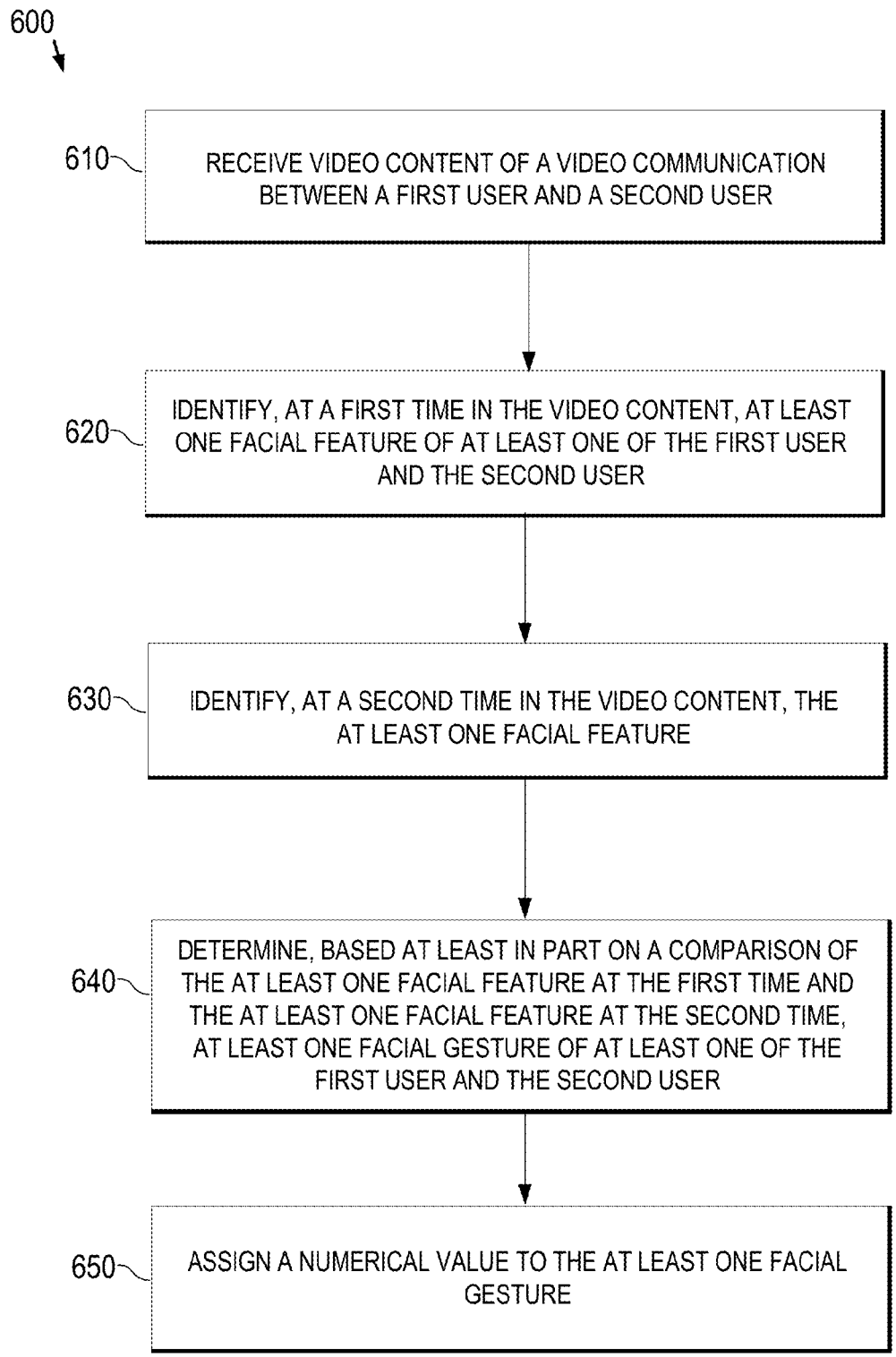
FIG. 6 shows an exemplary method of performing operations associated with facial gesture recognition and scoring in accordance with some embodiments of the disclosure.

FIG. 6 shows an exemplary method 600 for performing operations associated with assignment of numerical values to identified facial gestures as described herein. At block 610, the method 600 may include receiving, using a communication device 354 of a communication unit 234 of a video communication server 210, video content of a video communication between a first user and a second user. At block 620, the method 600 may include identifying, using the GPU 316, the facial/vocal recognition unit 318, and/or the gesture analysis unit 320 of the processing unit 228 of the video communication server 210, at a first time in the video content, at least one facial feature of at least one of the first user and the second user. At block 630, the method 600 may include identifying, using the GPU 316, the facial/vocal recognition unit 318, and/or the gesture analysis unit 320 of the processing unit 228 of the video communication server 210, at a second time in the video content, the at least one facial feature. At block 640, the method 600 may include determining, using the GPU 316, the facial/vocal recognition unit 318, and/or the gesture analysis unit 320 of the processing unit 228 of the video communication server 210, based at least in part on a comparison of the at least one facial feature at the first time and the at least one facial feature at the second time, at least one facial gesture of at least one of the first user and the second user. At block 650, the method 600 may include assigning, using the GPU 316, the facial/vocal recognition unit 318, and/or the gesture analysis unit 320 of the processing unit 228 of the video communication server 210, a numerical value to the at least one facial gesture. The numerical value may then be stored by the GPU 316 of the processing unit 228 of the video communication server 210 in the profile storage unit 332, the application data unit 328, and/or the cache storage unit 340 of the memory unit 230 of the video communication server 210.

Figure 7:
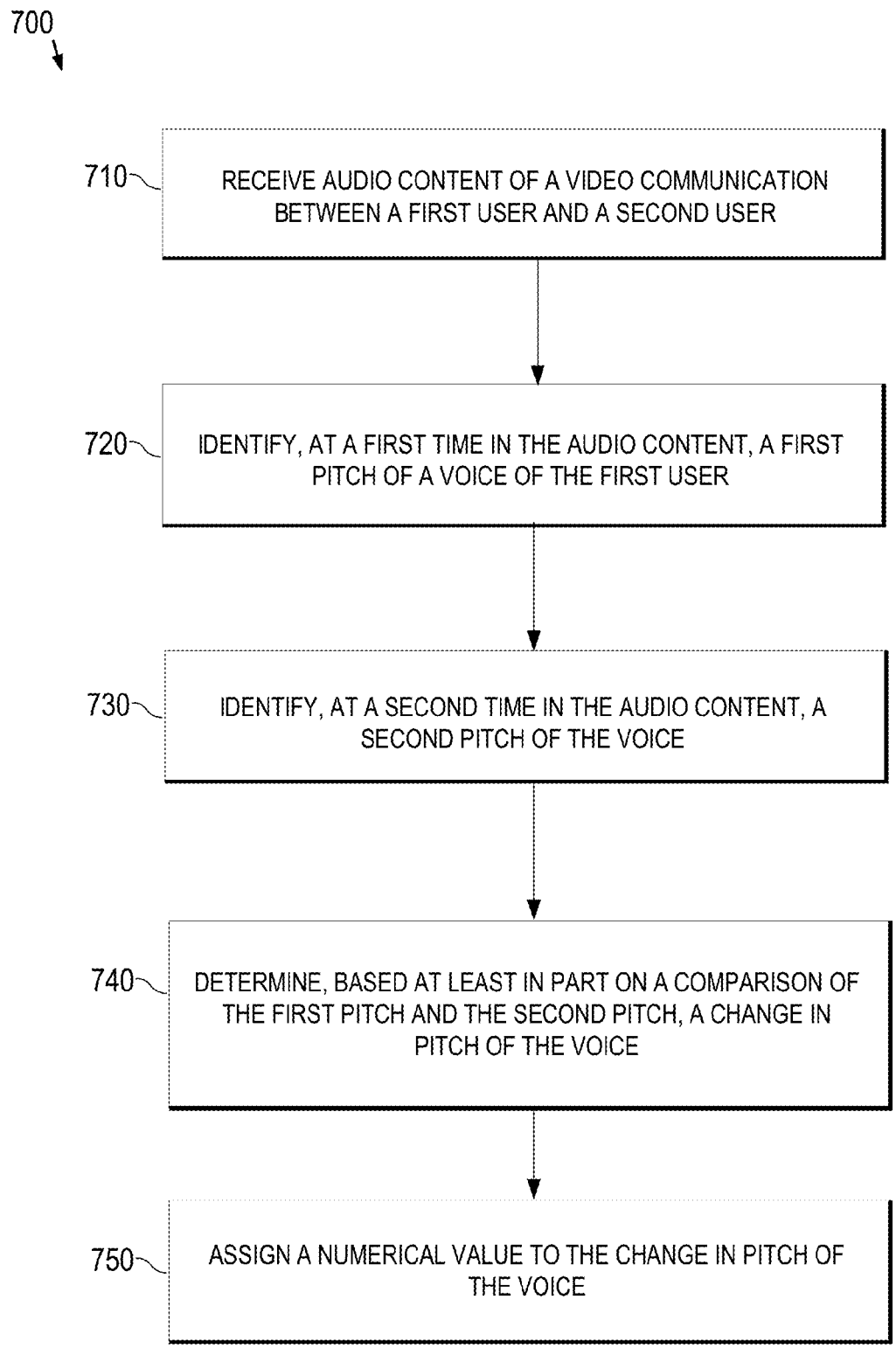
FIG. 7 shows an exemplary method of performing operations associated with vocal gesture recognition and scoring in accordance with some embodiments of the disclosure.

FIG. 7 shows an exemplary method 700 for performing operations associated with assignment of numerical values to identified changes in vocal pitch as described herein. At block 710, the method 700 may include receiving, using a communication device 354 of a communication unit 234 of a video communication server 210, audio content of a video communication between a first user and a second user. At block 720, the method 700 may include identifying, using the GPU 316, the facial/vocal recognition unit 318, and/or the gesture analysis unit 320 of the processing unit 228 of the video communication server 210, at a first time in the audio content, a first pitch of a voice of the first user. At block 730, the method 700 may include identifying, using the GPU 316, the facial/vocal recognition unit 318, and/or the gesture analysis unit 320 of the processing unit 228 of the video communication server 210, at a second time in the audio content, a second pitch of the voice. At block 740, the method 700 may include determining, using the GPU 316, the facial/vocal recognition unit 318, and/or the gesture analysis unit 320 of the processing unit 228 of the video communication server 210, based at least in part on a comparison of the first pitch and the second pitch, a change in pitch of the voice. At block 750, the method 700 may include assigning, using the GPU 316, the facial/vocal recognition unit 318, and/or the gesture analysis unit 320 of the processing unit 228 of the video communication server 210, a numerical value to the change in pitch of the voice.

Objectionable Content

In some embodiments, a video communications and personal compatibility communications system is provided, wherein the system comprises: a) at least one memory comprising instructions; b) a video communications device operable to receive and transmit video communications between first and second user devices; c) at least one profile management unit; d) at least one profile database; e) at least one compatibility unit; and d) at least one processing device in communication with and operable to manage the video communications device, the at least one profile management unit, the at least one profile database, and the at least one compatibility unit, the at least one processing device further operable to execute the instructions stored in the at least one memory, wherein executing the instructions causes the at least one processor to: initiate a video communication session between first and second users on the first and second user devices respectively, the at least one profile database operable to receive profile data for each of the first and second users from the profile management unit; analyze video transmitted between the first and second user devices in coordination with the video communications device; determine during the video communication session whether the transmitted video contains objectionable content; implement a safety protocol based on determining the transmitted video comprises objectionable content; receive a compatibility indication from each of the first and second devices if the safety protocol does not otherwise terminate the video communication session; determine, using the compatibility unit, a compatibility between the first and second users based at least in part on the received compatibility indications; and communicate an indication of the determined compatibility to the first and second user devices.

In some embodiments, executing the instructions that cause the at least one processor to determine the transmitted video comprises objectionable content further causes the at least one processor to: identify an object of interest comprised in the transmitted video; compare the object of interest to flagged objects stored in a flagged objects database, wherein flagged objects are objects other than facial features of the first and second users; and determine at least a partial match between the object of interest and a flagged object in the flagged object database.

In some embodiments, executing the instructions that cause the at least one processor to determine the transmitted video comprises objectionable content further causes the at least one processor to: identify an object of interest comprised in the transmitted video; compare the object of interest to permitted objects stored in a permitted objects database, wherein the permitted objects are facial features of the first and second users; and determine no match between the object of interest and a permitted object in the permitted object database.

In some embodiments, executing the instructions that cause the at least one processor to implement the safety protocol further causes the at least one processor to: modify at least a portion of the transmitted video prior to the transmitted video being displayed on at least one of the first user device and the second user device; suspend the video communication session for a predetermined amount of time; and terminate the video communication session.

In some embodiments, executing the instructions further causes the at least one processor to: generate an indication that a rule of video communication session has been violated in response to determining that the transmitted video comprises objectionable content; and transmitting the indication that a rule of video communication session has been violated to at least one of the first and second user devices.

In some embodiments, the compatibility indications are generated based at least in part on user input received from the first and second users at the first and second user devices, respectively.

In some embodiments, the objectionable content is comprised in at least one of an image frame of the video content and an audio portion of the video content.

In some embodiments, a non-transitory computer readable medium is provided, wherein the non-transitory computer readable medium comprises code, wherein the code, when executed by at least one processing device of a video communication server, causes the at least one processing device to perform the operations of: establishing, using a communication unit comprised in the at least one processing device, a video communication connection between a first user of a first user device and a second user of a second user device, wherein the video communication enables the first and second users to participate in a game session of a video dating game; receiving, at a video analysis unit comprised in the at least one processing device and during the game session, video content transmitted between the first user device and the second user device; determining, using a recognition unit comprised in the at least one processing device and during the game session, the video content comprises objectionable content based on analyzing the video content; and implementing, using a graphical processing unit (GPU) comprised in the at least one processing device, a safety protocol during the game session based on determining the video content comprises objectionable content.

In some embodiments, the code that, when executed by the at least one processing device of the video communication server, causes the at least one processing device to perform the operations of determining the video comprises objectionable content, further causes the at least one processing device to perform the operations of: identifying, using the recognition unit, an object of interest comprised in the video content; comparing, using the recognition unit, the object of interest to objects stored in a database; determining, using the recognition unit, at least a partial match between the object of interest and an object in the database.

In some embodiments, the code that, when executed by the at least one processing device of the video communication server, causes the at least one processing device to perform the operations of determining the video comprises objectionable content, further causes the at least one processing device to perform the operations of: identifying, using the recognition unit, an object of interest comprised in the video content; comparing, using the recognition unit, the object of interest to objects stored in a database; determining, using the recognition unit, no match between the object of interest and an object in the database.

In some embodiments, the code that, when executed by the at least one processing device of the video communication server, causes the at least one processing device to perform the operations of implement the safety protocol, further causes the at least one processing device to perform at least one of the operations of: suspending, using the GPU, the game session for a predetermined amount of time; and terminating, using the communication unit, the video communication connection.

In some embodiments, the code that, when executed by the at least one processing device of the video communication server, causes the at least one processing device to perform the operations of implement the safety protocol, further causes the at least one processing device to perform the operations of: modifying, using the GPU, at least a portion of the video content prior to the video content being displayed on at least one of the first user device and the second user device.

In some embodiments, the non-transitory computer readable medium further comprises code that, when executed by the at least one processing device of the video communication server, causes the at least one processing device to perform the operations of: generating, using the GPU, an indication that a rule of the video dating game has been broken in response to determining that the video content comprises objectionable content; and transmitting, using the communication unit, the indication to at least one of the first and second user devices.

In some embodiments, the objectionable content is comprised in at least one of an image frame of the video content and an audio portion of the video content.

In some embodiments, a method is provided, wherein the method comprises: establishing, using a communication unit comprised in the at least one processing device, a video communication connection between a first user of a first user device and a second user of a second user device, wherein the video communication enables the first and second users to participate in a game session of a video dating game; receiving, at a video analysis unit comprised in the at least one processing device and during the game session, video content transmitted between the first user device and the second user device; determining, using a recognition unit comprised in the at least one processing device and during the game session, the video content comprises objectionable content based on analyzing the video content; and implementing, using a graphical processing unit (GPU) comprised in the at least one processing device, a safety protocol during the game session based on determining the video content comprises objectionable content.

In some embodiments, determining the video content comprises objectionable content comprises: identifying, using the recognition unit, an object of interest comprised in the video content; comparing, using the recognition unit, the object of interest to objects stored in a database; and determining, using the recognition unit, at least a partial match between the object of interest and an object in the database.

In some embodiments, determining the video content comprises objectionable content comprises: identifying, using the recognition unit, an object of interest comprised in the video content; comparing, using the recognition unit, the object of interest to objects stored in a database; and determining, using the recognition unit, no match between the object of interest and an object in the database.

In some embodiments, implementing the safety protocol comprises at least one of: suspending, using the GPU, the game session for a predetermined amount of time; and terminating, using the communication unit, the video communication connection.

In some embodiments, implementing the safety protocol comprises: modifying, using the GPU, at least a portion of the video content prior to the video content being displayed on at least one of the first user device and the second user device.

In some embodiments, the method further comprises: generating, using the GPU, an indication that a rule of the video dating game has been broken in response to determining that the video content comprises objectionable content; and transmitting, using the communication unit, the indication to at least one of the first and second user devices.

Further Comments

While various implementations in accordance with the disclosed principles have been described above, it should be understood that they have been presented by way of example only, and are not limiting. Thus, the breadth and scope of the implementations should not be limited by any of the above-described exemplary implementations, but should be defined only in accordance with the claims and their equivalents issuing from this disclosure. Furthermore, the above advantages and features are provided in described implementations, but shall not limit the application of such issued claims to processes and structures accomplishing any or all of the above advantages.

Various terms used herein have special meanings within the present technical field. Whether a particular term should be construed as such a "term of art," depends on the context in which that term is used. "Connected to," "in communication with," "communicably linked to," "in communicable range of" or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the implementations set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any implementations in this disclosure. Neither is the "Summary" to be considered as a characterization of the implementations set forth in issued claims. Furthermore, any reference in this disclosure to "implementation" in the singular should not be used to argue that there is only a single point of novelty in this disclosure. Multiple implementations may be set forth according to the limitations of the multiple claims issuing from this disclosure, and such claims accordingly define the implementations, and their equivalents, that are protected thereby. In all instances, the scope of such claims shall be considered on their own merits in light of this disclosure, but should not be constrained by the headings herein.

Lastly, although similar reference numbers may be used to refer to similar elements for convenience, it can be appreciated that each of the various example implementations may be considered distinct variations.

What is claimed is:

1. A non-transitory computer readable medium comprising code, wherein the code, when executed by at least one processing device of a video communication server, causes the at least one processing device to perform operations of:
   determining, using a communication unit comprised in the at least one processing device, a video communication connection associated with a first user of a first user device, the video communication connection being associated with a time duration;
   analyzing, using a graphical processing unit (GPU) comprised in the at least one processing device, video content of the first user of the first user device;
   determining, using an analysis unit comprised in the at least one processing device, at least one emotion, of the first user, based on analyzing the video content; and
   generating, using a reporting unit comprised in the least one processing device, data for the first user based at least in part on the video communication connection or the video content, and the at least one determined emotion,
   wherein the time duration of the video communication connection comprises a time duration of the at least one determined emotion.

2. The non-transitory computer readable medium of claim 1, wherein the video content comprises real-time video content.

3. The non-transitory computer readable medium of claim 1, wherein the time duration of the video communication connection comprises a partial time duration of the video communication connection.

4. The non-transitory computer readable medium of claim 1, wherein the at least one determined emotion is associated with at least one of a visual gesture or a vocal gesture.

5. The non-transitory computer readable medium of claim 1, wherein the video content comprises at least one of media content, social content, or political content.

6. The non-transitory computer readable medium of claim 1, wherein the at least one determined emotion is associated with an object of interest in the video content.

7. The non-transitory computer readable medium of claim 6, wherein the object of interest comprises at least one of a facial feature, a facial gesture, a vocal inflection, a vocal pitch shift, a change in word delivery speed, a keyword, an ambient noise or an environment noise.

\* \* \* \* \*